(12) United States Patent
Tsuda et al.

(10) Patent No.: US 8,910,673 B2
(45) Date of Patent: Dec. 16, 2014

(54) SYNTHETIC RESIN BOTTLE, AND A COMBINATION OF REGULARLY USED CONTAINER AND REFILL CONTAINER

(75) Inventors: Naoki Tsuda, Tokyo-to (JP); Tsuyoshi Sasaki, Tokyo-to (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 339 days.

(21) Appl. No.: 13/504,004

(22) PCT Filed: Dec. 17, 2010

(86) PCT No.: PCT/JP2010/072756
§ 371 (c)(1),
(2), (4) Date: Apr. 25, 2012

(87) PCT Pub. No.: WO2011/078078
PCT Pub. Date: Jun. 30, 2011

(65) Prior Publication Data
US 2012/0216918 A1    Aug. 30, 2012

(30) Foreign Application Priority Data

Dec. 25, 2009  (JP) ................................. 2009-295888
Dec. 28, 2009  (JP) ................................. 2009-296714
Dec. 28, 2009  (JP) ................................. 2009-296715
Nov. 30, 2010  (JP) ................................. 2010-266161

(51) Int. Cl.
*B65D 1/40*    (2006.01)
*B65D 1/02*    (2006.01)
*B65D 81/24*   (2006.01)
*B65D 21/08*   (2006.01)
*B65D 79/00*   (2006.01)

(52) U.S. Cl.
CPC .............. *B65D 1/0292* (2013.01); *B65D 81/24* (2013.01); *B65D 21/086* (2013.01); *B65D 79/005* (2013.01)
USPC ............ 141/114; 141/364; 141/372; 220/666

(58) Field of Classification Search
CPC .... B65D 1/0292; B65D 21/08; B65D 21/086; B65D 47/06
USPC ........... 141/18, 114, 363–365, 369, 370, 372; 220/666–667
See application file for complete search history.

(56) References Cited

U.S. PATENT DOCUMENTS 2,773,521 A * 12/1956 Persson ............................ 141/5
3,237,840 A *  3/1966 Clifford ....................... 229/110

(Continued)

FOREIGN PATENT DOCUMENTS

JP    U-06-27551     4/1994
JP    A-2000-033926  2/2000

(Continued)

OTHER PUBLICATIONS

International Search Report issued in International Application No. PCT/JP2010/072756 dated Mar. 8, 2011 (with translation).

*Primary Examiner* — Nicolas A Arnett
(74) *Attorney, Agent, or Firm* — Oliff PLC

(57) ABSTRACT

A bottle shape is provided that allows for volume-reducing deformation of a peripheral wall of the body, while maintaining stable posture of the bottle by making use of a combination of a refill container and a regularly used container having an upright discharge cylinder segment. The body is formed to have a thin peripheral wall so that volume-reducing deformation would take place along with the depressurization going on inside the bottle. The peripheral wall has three ridge lines formed in a mountain fold at approximately equal intervals in the vertical direction and has three panel walls connected to one another. Each panel wall is bordered by two adjacent ridge lines, and has a valley fold line that diagonally connects an upper end of one ridge line to a lower end of another adjacent ridge line so that three valley fold lines are disposed obliquely in parallel along a circumferential direction.

12 Claims, 19 Drawing Sheets

(56) References Cited

U.S. PATENT DOCUMENTS

| | | | |
|---|---|---|---|
| 3,354,924 A * | 11/1967 | Birrell et al. | 220/666 |
| 5,080,260 A * | 1/1992 | During | 222/107 |
| 5,255,808 A * | 10/1993 | Tobler | 220/6 |
| 5,524,789 A * | 6/1996 | Jackman | 220/666 |
| 5,740,942 A * | 4/1998 | Araujo, Jr. | 220/666 |
| 6,126,315 A * | 10/2000 | Ichikawa et al. | 383/43 |
| 6,158,620 A * | 12/2000 | Polan | 222/92 |
| 6,360,795 B1 * | 3/2002 | Bothe et al. | 141/346 |
| 7,530,475 B2 * | 5/2009 | Ophardt | 222/94 |
| 7,802,691 B2 * | 9/2010 | Mušalek | 215/381 |
| 7,857,156 B2 * | 12/2010 | Inomata | 215/381 |
| 8,215,509 B2 * | 7/2012 | Kuboi et al. | 215/381 |
| 8,365,954 B2 * | 2/2013 | Ophardt et al. | 222/95 |
| 8,672,183 B2 * | 3/2014 | Ophardt et al. | 222/95 |
| 2006/0032865 A1 * | 2/2006 | Ophardt | 222/94 |
| 2009/0114617 A1 * | 5/2009 | Inomata | 215/379 |

FOREIGN PATENT DOCUMENTS

| | | |
|---|---|---|
| JP | A-2003-267403 | 9/2003 |
| JP | A-2004-099082 | 4/2004 |
| JP | A-2007-161322 | 6/2007 |

* cited by examiner

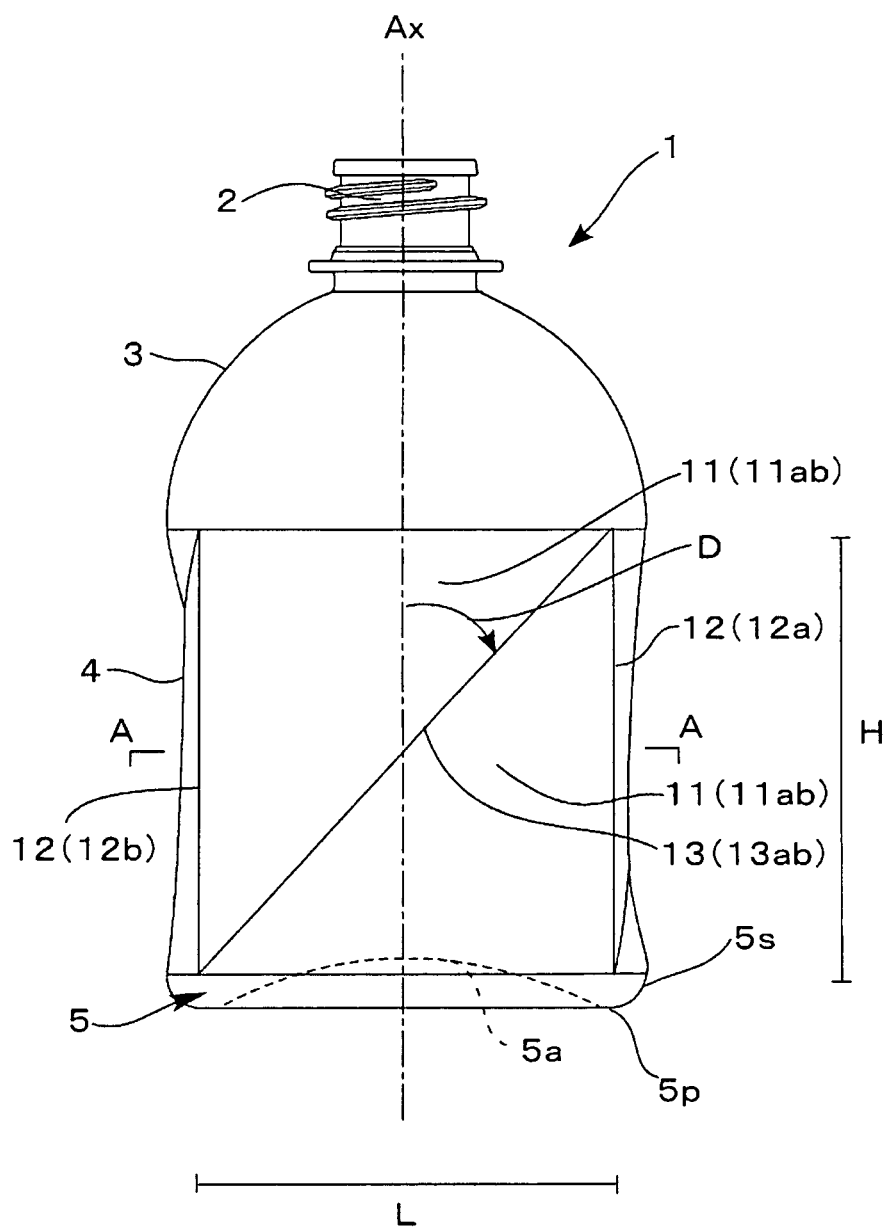

Fig.16A
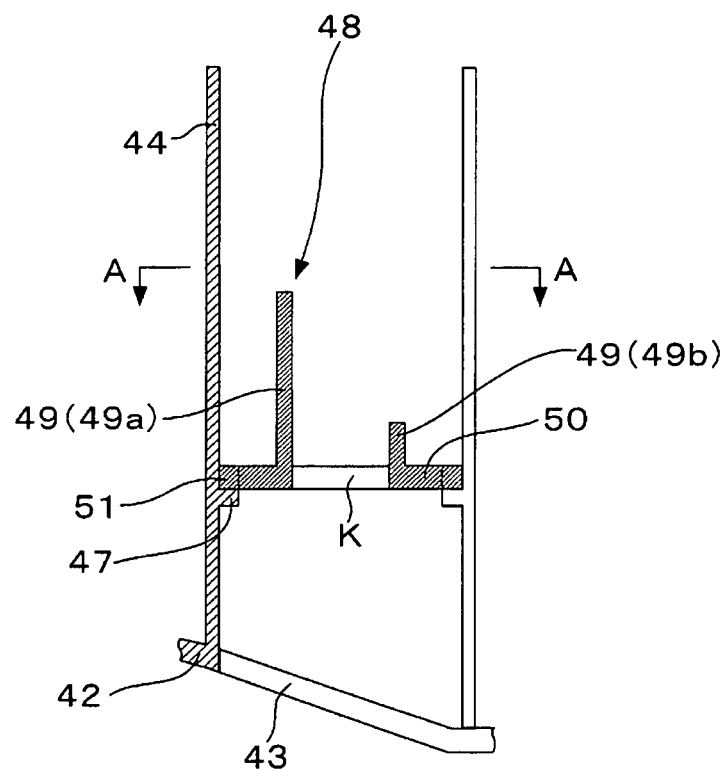
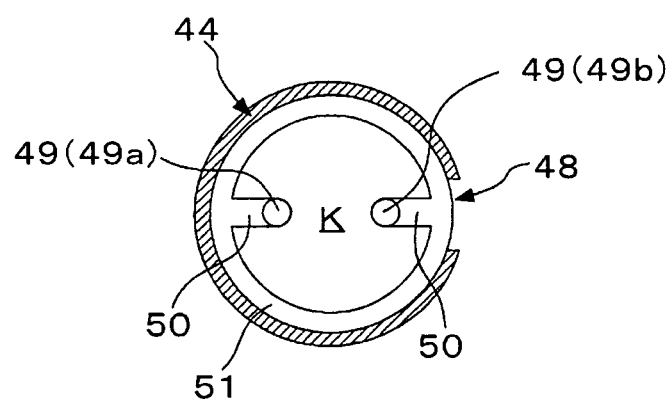
Fig.16B

SYNTHETIC RESIN BOTTLE, AND A COMBINATION OF REGULARLY USED CONTAINER AND REFILL CONTAINER

TECHNICAL FIELD

This invention relates to a synthetic resin bottle formed to have a thin wall so that volume-reducing deformation may proceed along with depressurization inside the bottle.

This invention also relates to a combination of a regularly used container and a refill container, wherein both containers are used for detergents, fabric softeners, bleach, bath salts, foods, cosmetics, chemicals, and the like.

BACKGROUND ART

Refill containers are becoming more and more utilized in many applications of use, for example, detergents, food seasoning, etc., from points of view of cost reduction, resources saving, or natural environmental conservation. A relatively thick container body is normally used to contain content fluids and is provided with, e.g., a weighing mechanism at the pour spout (hereinafter referred to as the regularly used container). On the other hand, the content fluid for refill use is stored in a low-cost refill container, from which the content fluid is poured into the regularly used container.

As regards the refill containers, so-called pouch containers have conventionally been in wide use as the refill containers of this kind. The pouch container, such as described in Patent Document 1, is made from overlapped pieces of flexible sheet.

At the time of refilling the regularly used container with a content fluid coming from a refill container, the content fluid is usually poured from the refill container into the regularly used container. Pouring liquid content may cause splashes or drips of the liquid, thus resulting in stained surroundings. Another discontent is that one has to hold the refill container with a hand until refilling is complete, and thus, the refill work has been troublesome.

In this point, the pouch container described in Patent Document 1 is provided with a nozzle receiving portion, which serves as a discharge port for the pouch container. This nozzle receiving portion is fitted around a discharge nozzle of the regularly used container so that the content fluid can be poured into the regularly used container. Since in this case, the content fluid is passed through the nozzle receiving portion, the splashes or drips of the content fluid can be controlled.

Patent Document 2 describes the features regarding a method of attaching a refill container to a regularly used container in a manner to eliminate the above-described liquid splashes or drips. A basic feature regarding this attaching method comprises a transition cap disposed in an opening of the body of the regularly used container, where a tube-like nozzle projects from the opening. Meanwhile, a fit joint, provided with an inner lid by way of a weakened portion, is fitted firmly to the opening of the refill container. At the time of refill work, the transition cap is fitted to the fit joint in a liquid-tight manner. With this fitting operation, the nozzle projecting from the transition cap opens the inner lid disposed in the fit joint.

According to the above-described prior art, the inner lid is opened under a condition that the fit joint of the refill container has been fitted to the transition cap of the regularly used container in the liquid-tight manner. Under this condition, there would be no liquid splashes or drips. Since the refill container is fitted to the regularly used container at an inverted position, it is not necessary for the user to keep holding the refill container with a hand.

PRIOR ART DOCUMENTS

Patent Documents

Patent document 1: Published patent application JP 2003-267403
Patent document 2: Published patent application JP 2004-099082

SUMMARY OF THE INVENTION

Problems to be Solved by the Invention

In the case of the pouch container of the above-described Patent Document 1, the refill container can be kept at its inverted position by fitting the nozzle receiving portion around the discharge nozzle of the regularly used container. But as the discharge of the content fluid continues, there is volume-reducing deformation, and the pouch container flattens. In that state, the inverted position cannot be maintained stably, because the flattened portion would bend and get off-balance. As a result, the pouch container may fall along with the regularly used container. Because of this problem, the user is required to keep an eye on the refill work and to support the refill container lightly with a hand. Therefore, this pouch container is not convenient to use.

In addition, even if the method of attaching a refill container to the regularly used container, such as described in the Patent Document 2, has been adopted, but if the above-described pouch container is used as the refill container, then likewise it is difficult to maintain the inverted position stably until the refill work is complete.

Furthermore, the attaching method described in the Patent Document 2 has another problem. Since the inner lid, which is forced to open by the nozzle, has a simple flat-plate structure, the inner lid is positioned to almost block the upper end opening of the nozzle after the nozzle has pushed up the inner lid. Because the upper end opening is almost blocked, the content fluid flows through both sides of the nozzle. But since this passage also serves as an "escape" passage for air to go up from the regularly used container to the refill container, the refill work for the content fluid cannot be smoothly achieved.

Therefore, this invention has been made to solve the problems associated with the conventional refill containers described above. Thus, this invention relates to a blow-molded synthetic resin bottle having a thin wall. A technical problem to be solved by this invention is to create a bottle shape that can allow for smooth volume-reducing deformation of a peripheral wall of the body that takes place along with inside depressurization, while maintaining stable posture of the bottle, This invention also relates to a combination of a refill container and a regularly used container having an upright discharge cylinder segment. Regarding this combination, other technical problems to be solved by this invention are to attain at stable refill work for the content fluid and to obtain a favorable waste disposal condition for the refill container. An object of this invention is thus to refill smoothly the regularly used container with the content fluid. Another object of this invention is to obtain used refill containers in their good waste disposal condition.

Means of Solving the Problems

This invention relates to a synthetic resin bottle and to a combination of a regularly used container and a refill container. Initially, the synthetic resin bottle of this invention will be described. Then, the combination of the regularly used container and the refill container will be described.

Among the means of solving above-described problems, a main feature of the synthetic resin bottle of this invention is that in the blow molded synthetic resin bottle having a neck, a tapered cylindrical shoulder, a cylindrical body, and a bottom, the body is formed to have a thin peripheral wall so that volume-reducing deformation of the body would be able to go on along with depressurization inside the bottle. The peripheral wall has three ridge lines formed in a mountain fold at approximately equal intervals in the vertical direction and has three panel walls connected to one another. Each panel wall is bordered by two adjacent ridge lines, and has a valley fold line that diagonally connects an upper end of one ridge line to a lower end of another adjacent ridge line so that three valley fold lines are disposed obliquely in parallel along a circumferential direction.

According to the above-described feature, the body has a thin peripheral wall so that the volume-reducing deformation would be able to proceed along with the depressurization inside the bottle. Thus, the bottle deforms voluntarily by a difference in pressure between the inside and outside of the bottle caused by depressurization inside the bottle, but without forcibly applying any pushing force or twisting force from outside. These ridge lines and valley fold lines are the necessary requirements for the peripheral wall to proceed smoothly with voluntary volume-reducing deformation, while maintaining a stable position.

If it is assumed that the bottle having the above feature is used as a refill container, the bottle filled with the content fluid to the full can be inverted under a condition that the neck has been firmly fitted to a regularly used container, and a certain amount of the content fluid can be discharged under its own weight without allowing outside air to enter the bottle inside.

At that time, with the progression in the discharge of the content fluid, the peripheral wall of the body deforms into a twisted shape, while the shoulder and the bottom keep their original shapes. The valley fold lines on the relatively thin wall serve as the starting points for the wall to deform into a twisted, squashed shape. As a result, the body has decreased in its height. This twisting deformation and the decrease in height of the body keep the bottle in its inverted upright position from its initial shape to the last moment of volume-reducing deformation. Since this refill container is free from any trouble of falling to a side, as is often found in pouch containers, there is no need of holding the bottle with a hand, and the refill work can be carried out smoothly.

Described below is a detailed mechanism of the volume-reducing deformation which the peripheral wall of the bottle undergoes along with the progression of discharge. With the ongoing discharge of the content fluid, pushing force acts on the entire peripheral wall of the bottle due to a difference in pressures between inside and outside. Each of the three panel walls of the peripheral body wall has a valley fold line disposed obliquely. The volume-reducing deformation of the panel walls proceeds in such a manner that when panel walls are folded, the three valley fold lines come close to the central axis of the bottle. At that time, using the fold line as the starting point, each panel is folded along the fold line into a collapsing shape.

On the other hand, the three ridge lines in a mountain fold are formed in the vertical direction, and perform a function as pillars holding against the pushing force. The ridge lines maintain their initial distance to the central axis of the bottle even during the progression of the volume-reducing deformation, and allow the peripheral wall to take a right triangular shape in its cross-sectional view, thus performing a function of maintaining a stable inverted position of the bottle even under the condition of volume-reducing deformation. At that time, each ridge line is displaced obliquely with the progression of collapsing deformation of panel walls along the valley fold lines, while maintaining an almost initial distance to the central axis, as described above. As a result, the peripheral wall of the body deforms into a twisted shape and gives the bottle a decrease in height.

Another feature of this invention associated with the synthetic resin bottle is that the peripheral wall of the body has an average thickness of 0.2 mm or less, in addition to the above main feature.

By setting an average thickness at 0.2 mm or less for the peripheral wall of the body, it becomes possible to achieve smoothly the volume-reducing deformation occurring along with the inside depressurization. As regards the lower limit to the thickness of the peripheral wall, this limit can be set appropriately from a point of view of a self-standing capability of the bottle.

Preferably, the peripheral wall of the body has an average wall thickness ranging from 0.05 to 0.15 mm. By setting the thickness in this range for the peripheral body wall, it becomes possible to achieve smoothly and reliably the volume-reducing deformation occurring along with the inside depressurization.

Still another feature of this invention associated with the synthetic resin bottle is that, in the main feature described above, a ratio of a length between two adjacent ridge lines to a height of each ridge line, i.e., a length to height ratio, is set in a range of from 0.6 to 1.7.

The above-described feature is relevant to an angle of gradient of the valley fold lines formed on the panel walls. A length/height ratio in the range of 0.6 to 1.7 is equivalent to an angle of gradient in a range of 30 to 60 degrees, which the fold lines take relative to the ridge lines formed in the vertical direction. By setting an angle of gradient in this range, it is possible to proceed fully with the twisting deformation of the body and the accompanying decrease in height and to proceed smoothly with the volume-reducing deformation, while keeping the bottle roughly upright in its inverted position. If this angle of gradient is too small, i.e., if the fold lines extend too vertically, the twist angle can be enlarged in the twisting deformation, but the three fold lines come in contact with one another, and as a result, the refill container falls short in the decrease in height. On the other hand, if the angle of gradient is too large, i.e., if the fold lines extend too laterally, it becomes impossible to get a large twist angle in the twisting deformation. In that case, the refill container also falls short in the decrease in height.

Still another feature of this invention associated with the synthetic resin bottle is that, in the main feature described above, the shoulder and the bottom have, respectively, a semi-spherical shell shape and a short cylindrical shape with one end closed.

According to the above-described feature, the collapsing deformation caused by depressurization inside the bottle is hard to develop in the shoulder and bottom portions, which respectively have the semi-spherical shell shape and the short cylindrical shape with one end closed. Instead, the deformation of the body can be preferentially made to proceed. Thus, the volume-reducing deformation of the bottle can go on smoothly, while keeping the bottle roughly upright in its inverted position.

Still another feature of this invention associated with the synthetic resin bottle is that, in the main feature described above, the three ridge lines are extended to a side peripheral wall of the bottom so that these ridge lines would give the bottom a short triangular cylindrical shape with one end closed.

According to the feature described above, it has been pre-arranged that the bottom would be given a triangular cross-sectional shape. This feature is intended to proceed with the twisting deformation of the body and the volume-reducing deformation of the bottle smoothly.

Still another feature of this invention associated with the synthetic resin bottle is that, in the main feature described above, a sunken portion is formed in a central area of the bottom by allowing a bottom plate to draw upward in the inward direction of the bottle.

Since the sunken portion is formed in the central area of the bottom plate due to this feature, a ring-like base portion remaining in a peripheral edging zone of the bottom performs a function as a peripheral rib. After the content fluid has been discharged, the bottle is squashed in the vertical direction by pushing down on the bottom plate. Since, at that time, the pushing force spreads over the bottom by this peripheral base portion, the bottle can be squashed fully in such a way that the body or the bottom is embedded into the semi-spherical shell-like shoulder smoothly, while keeping the bottom shape.

This invention is further described with respect to a combination of the regularly used container and a refill container (hereinafter referred to as "container combination"). The features of this invention associated with the "container combination" are based on the use of the bottle of this invention described above as the refill container. A main feature of this invention is that a regularly used container is assembled with a refill container, wherein the regularly used container has a main-body cap fitted to the neck of a container main body, and the cap has a discharge cylinder segment disposed upright in the neck to form discharge passage, and wherein the refill container is a bottle containing a content fluid for refill use and has a lid attachment fitted to the neck of the bottle. The body of the bottle is formed to have a thin wall so that volume-reducing deformation would takes place under the inside depressurization that develops when the content fluid is discharged by spontaneously downward flow in gravity. The lid attachment has a fitting cylinder, which is fitted in the discharge cylinder segment of the regularly used container. An inner lid is used to close this fitting cylinder. A lid opening device is disposed inside the discharge cylinder segment of the regularly used container to push and raise the inner lid of the fitting cylinder fitted to the neck of the refill container. This makes it possible to make the content fluid refillable when the refill container is fitted to the regularly used container.

The fitting cylinder of the inverted refill container is fitted from upward in the discharge cylinder segment of the regularly used container by pushing down the refill container. Once the fitting cylinder has been fitted to the discharge cylinder segment, the refill container in its inverted position is attached steadily to the regularly used container. If the fitting cylinder is further pushed into the discharge cylinder segment, the lid opening device of the regularly used container bumps into the inner lid of the refill container, and the lid is pushed up and displaced to a tilted position to open the bottle.

The bottle containing the content fluid nearly to the full is inverted with its neck fitted firmly. If the bottle in this posture is then opened, a constant amount of the content fluid flows down from the bottle under its own weight without bringing in outside air. Thus, the body deforms due to volume reduction with the progression of discharge of the content fluid.

At that time, the bottle of this invention used as the refill container decreases in its height in the vertical direction as the body folds and deforms into a twisted, squashed shape, as described above. Since the bottle deforms as a result of volume reduction, but remains upright in its inverted position, the refill container assembled with the regularly used container can be kept in a self-standing position stably during the period when the volume-reducing deformation of the body goes on.

Another feature of this invention associated with the "container combination" is that, in the main combination feature described above, a cross-sectional area of the discharge passage formed by opening the inner lid is set at a level large enough to enable air bubbles to go up intermittently alongside the downward flow of the content fluid, and is dischargeable in all amount by spontaneously flowing down under its own weight.

According to the immediately above main feature associated with the "container combination," the content fluid is continuously discharged under its own weight, but when the body of the bottle will have deformed to some extent due to volume reduction, the content fluid automatically stops being discharged under its own weight. This is because there develops resistance along with the volume-reducing deformation of the body of the bottle. From this stage, there are largely two ways to handle the discharge, depending on the cross-sectional area of the discharge passage formed by opening the inner lid. The above-described feature is associated with one of the two ways to handle the discharge. Under this embodiment, the passage has a relatively large cross-sectional area. Air bubbles go up into the bottle through the opening formed by opening the inner lid. The content fluid intermittently flows down from the bottle as much as air bubbles go upward. In this way, the entire amount of the content fluid can be poured into the regularly used container by allowing the content fluid to flow down spontaneously under its own weight. The user has no need to stand by to help with the refill work.

With the completion of the refill work, the content fluid ceases to flow down spontaneously, and the body of the refill container would have a fully deformed shape due to the volume reduction. When this refill container is removed from the regularly used container for waste disposal, the container is pushed down from upside to give the container an almost squashed shape.

Still another feature of this invention associated with the "container combination" is that, in the above-described main combination feature, the cross-sectional area of the discharge passage formed by opening the inner lid is set at a level small enough to cause no air bubble to go up alongside the downward flow of the content fluid. Any remaining content fluid is forcibly discharged by pushing down on the bottom of the bottle.

The above feature is concerned with the other way to handle the discharge, after the content fluid automatically stops being discharged under its own weight due to the resistance that develops along with the volume-reducing deformation of the body of the bottle. In this case, the passage has a relatively restricted cross-sectional area so that air bubbles would not go up into the bottle through the opening formed by liberating the inner lid. Thus, the content fluid is prevented from flowing down intermittently.

When the content fluid automatically stops being discharged under its own weight, the bottle has already deformed to some extent due to the volume reduction. Any remaining content fluid is forcibly discharged by pushing down on the bottom of the bottle. In this way, the discharge operation or refill work for the content fluid can be finished in a short period of time.

Since the refill work is completed by forcibly pushing down on the bottom of the bottle, the refill container has been squashed in the vertical direction at the end of the refill work, with its size being fully decreased. The vacant squashed bottle only needs to be pulled out of the regularly used container and discarded. Therefore, it is possible to discharge the content fluid and decrease the bottle size all together by forcibly squashing the bottle.

Still another feature of this invention associated with the "container combination" is that, in the main combination feature described above, the inner lid is disposed in a foremost portion of the fitting cylinder.

Since the inner lid can be disposed in a foremost portion, and near the opening, of the fitting cylinder, it is easy to put the inner lid at a position opposed to the lid opening device. The lid opening device can be opposed to the inner lid without thrusting the lid opening device deep into the fitting cylinder, and thus this device can have a simplified structure.

Still another feature of this invention associated with the container combination is that, in the main combination feature described above, the lid opening device is provided with pushing and holding portions, which comprise a pushing portion for pushing up and opening the inner lid and a holding portion for keeping the lid in an open state.

In the case of the pushing and holding portions comprising a pushing portion and a holding portion, the inner lid is pushed up and the passage is opened by the pushing portion, and then is continuously kept in an inclined open state by the holding portion. The cross-sectional area of the passage now available is maintained stable and constant.

Still another feature of this invention associated with the "container combination" is that, in the above main combination feature, the inner lid is fitted to the fitting cylinder by a hinge.

If a hinged inner lid is fitted to the fitting cylinder, the open lid can be held in a constant direction in which the lid is pushed and raised. Thus, the opening and inclining movements of the inner lid can be made stable and constant.

Effects of the Invention

This invention having the above-described features has the effects described below. It is assumed that the synthetic resin bottle of this invention having the main feature is utilized as a refill container. With the ongoing discharge of the content fluid, the peripheral wall of the body deforms into a twisted shape, while the shoulder and the bottom keep their original shapes. The valley fold lines on the relatively thin wall serve as the starting points for the wall to deform into a twisted, squashed shape, thus resulting in a body that decreases in height. When the volume-reducing deformation of the bottle is in progress, the bottle keeps its upright inverted posture without bending in half. Since this refill container has no fear of falling to a side, as often found in pouch containers, there is no need of holding the bottle with a hand, and the refill work can be carried out steadily.

The "container combination" of this invention having the main combination feature allows for the smooth volume-reducing deformation of the bottle that proceeds when the content fluid flows down spontaneously under its own weight. Since the refill container in the inverted position remains stably fitted to the regularly used container, the assembled refill container and the regularly used container perform a stable self-standing function. Thus, the refill work for the content fluid goes on steadily with no need for the user to support the refill container with a hand.

After the discharge of the content fluid has been complete, the bottle is in a state in which it was deformed to some extent by the volume reduction. The bottle can be easily squashed by applying pushing force in the vertical direction. The squashed bottle is adequate for efficient waste disposal.

The passage formed by opening the inner lid may have a relatively large cross-sectional area. In that case, bubbles of outside air go up into the inverted bottle through the opening, and the discharge of the content fluid continues intermittently. In this manner, the content fluid flows down spontaneously under its own weight, and the discharge of the entire amount can be completed with no need of supporting the bottle with a hand.

Yet the passage may have a relatively small cross-sectional area. In that case, bubbles of air are prevented from going up through the opening formed by opening the inner lid. When the flow of the content fluid under its own weight automatically comes to a halt, the bottle has already deformed to some extent. This deformed bottle can be further pushed down from upward to discharge forcibly the remaining content fluid and to complete the refill work in a short period.

If the pushing and holding portions comprise a pushing portion, which pushes up the inner lid to open the passage, and a holding portion, which keeps the inner lid in an open position, the passage thus opened has a cross-sectional area that allows for a stable and constant flow. This is because the pushing portion pushes up and opens the inner lid until the lid takes a tilted position, and then the holding portion keeps the lid at the open, tilted position.

BRIEF DESCRIPTION OF THE DRAWINGS

FIG. 1 is a front view showing the bottle of this invention in the first embodiment.

FIGS. 16($a$) and 16($b$) are a vertical sectional view and a plan view, respectively, of the lid opening device shown in FIG. 11.

PREFERRED EMBODIMENTS OF THE INVENTION

Figure 2A:
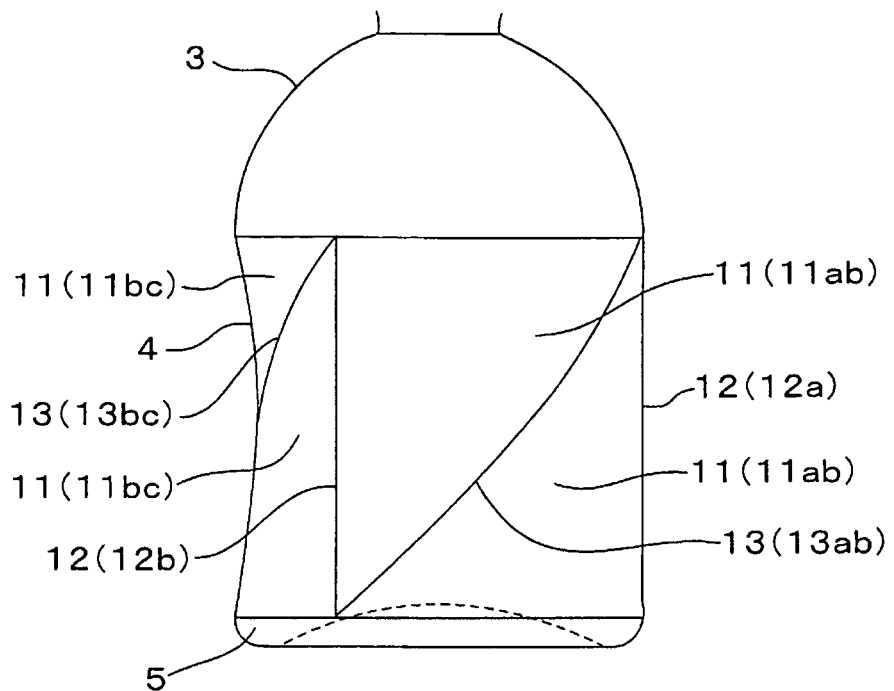
FIG. 2($a$) is a side view, and FIG. 2($b$) is a rear view, respectively, of the bottle of FIG. 1.
Figure 2B:
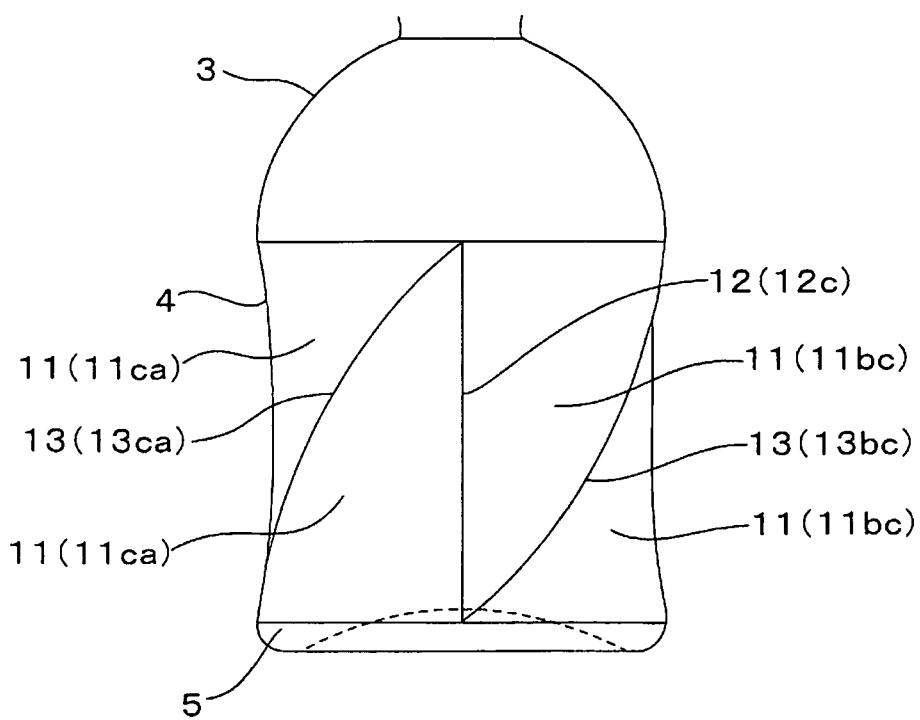
Figure 3:
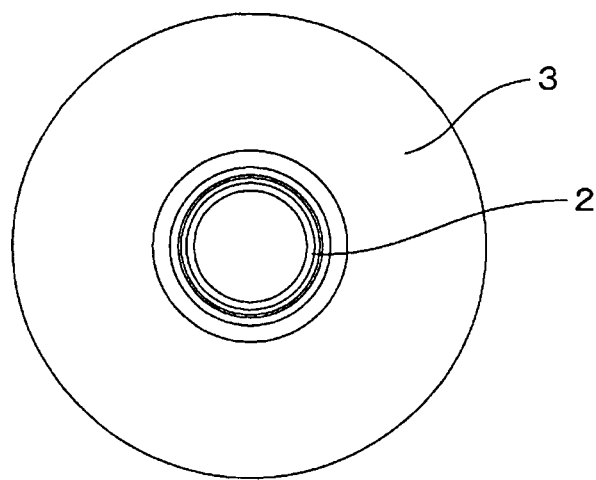
FIG. 3 is a plan view of the bottle of FIG. 1.
Figure 4:
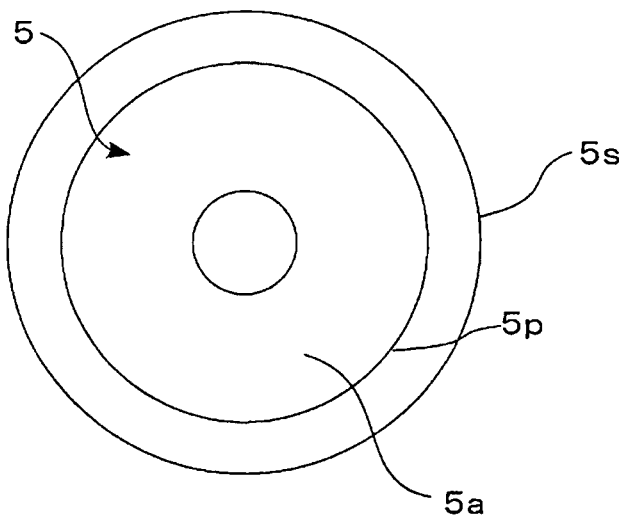
FIG. 4 is a bottom view of the bottle of FIG. 1.
Figure 5:
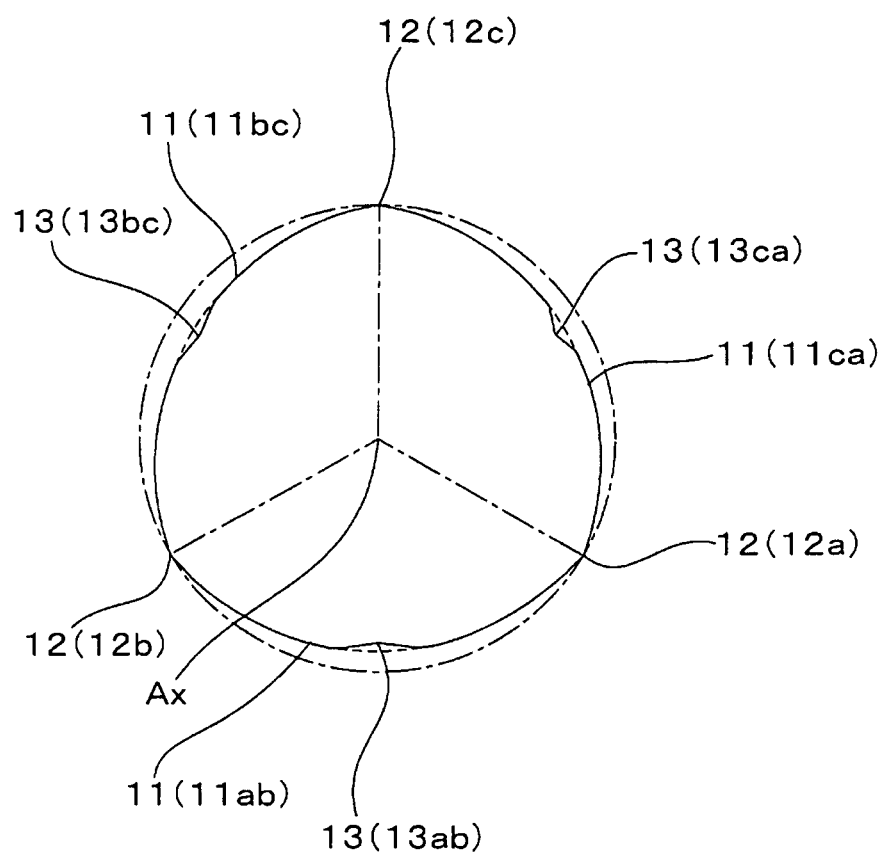
FIG. 5 is a plane cross-sectional view of the bottle taken along line A-A in FIG. 1.
Figure 6:
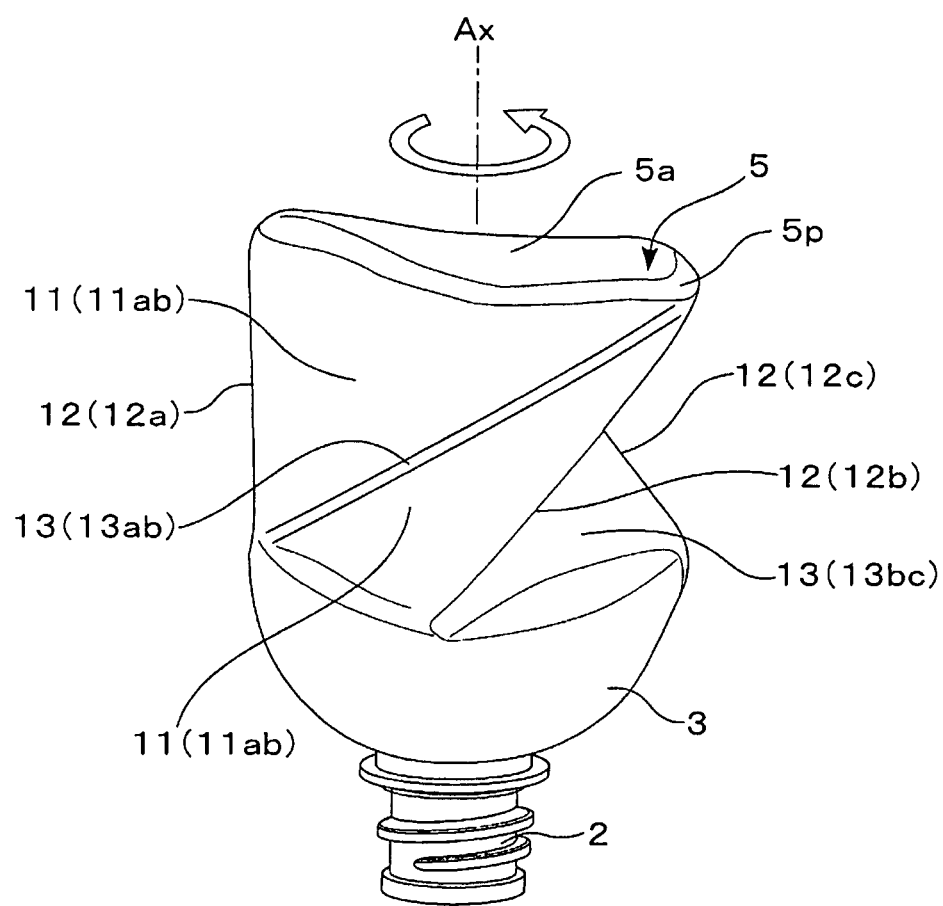
FIG. 6 is a perspective view of the bottle of FIG. 1 showing volume-reducing deformation.
Figure 7:
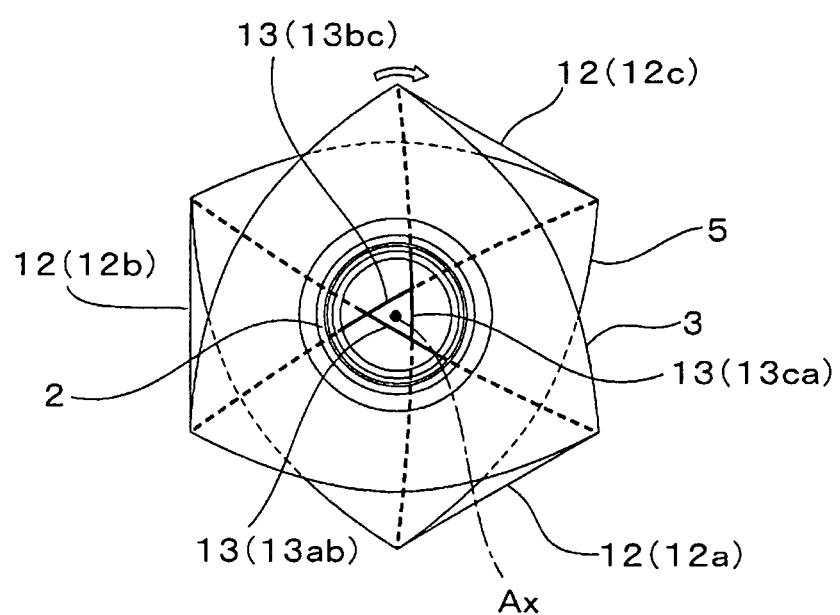
FIG. 7 is a plan view of the bottle in the state shown in FIG. 6.

This invention is further described with respect to preferred embodiments of the synthetic resin bottle and of the "container combination" of this invention, now referring to the drawings. FIGS. 1-7 show the bottle of this invention in the first embodiment, in which FIG. 1 is a front view showing the bottle in the first embodiment of this invention; FIG. 2(a) is a side view, and FIG. 2(b) is a rear view, respectively, of the bottle of FIG. 1; FIG. 3 is a plan view of the bottle of FIG. 1; FIG. 4 is a bottom view of the bottle of FIG. 1; FIG. 5 is a plane cross-sectional view of the bottle taken along line A-A in FIG. 1; FIG. 6 is a perspective view of the bottle of FIG. 1 showing volume-reducing deformation; and FIG. 7 is a plan view of the bottle in the state shown in FIG. 6. This bottle 1 is a biaxially-drawn, blow molded product made of a polypropylene resin, and comprises a neck 2, a shoulder 3 in a shape of a semi-spherical and tapered cylinder, a cylindrical body 4, and a bottom 5 in a short cylindrical shape with one end closed. The bottle is 125 mm high, 70 mm wide, and 300 ml in capacity. A side peripheral wall 5s of the bottom 5 has a shape of a short cylinder. A ring-like peripheral base portion 5p surrounds a sunken portion 5a, which is made by drawing in a central part of the bottom plate upward into the body.

Three ridge lines 12 (12a, 12b, 12c) are disposed on the peripheral wall of the body 4 in a mountain fold, in the vertical direction and at even intervals. As can be seen in FIG. 5, the peripheral wall comprises three panel walls 11 (11ab, 11bc, 11ca) having an arc shape in the cross-sectional view, and the panel walls are connected to one another by the three ridge lines 12. Each panel wall 11 has a valley fold line 13 (13ab, 13bc, or 13ca), which diagonally connects an upper end of a ridge line 12 located on one side to a lower end of another ridge line 12 located on the other side. These three valley fold lines 13 are inclined in parallel in the circumferential direction (In FIGS. 1 and 2, the lines are inclined diagonally from right upper to left lower.). For easy understanding of deforming behavior, each figure shows the ridge line 12 as 12a, 12b, or 12c to distinguish among the three ridge lines and to correlate the ridge lines among the figures. This applies also to the panel walls 11 and the valley fold lines 13.

As found in the cross-sectional view of FIG. 5, the three ridge lines 12 are disposed at three apexes of a regular triangle, and serve as pillars holding against lateral force. The peripheral wall of the body 4 except for the ridge lines 12 is formed so as to be narrower in a mid-height than in both of upper and lower ends. As found in FIG. 1, the L/H ratio is equal to about 1 where L is a length between two adjacent ridge lines and H is a height of the ridge lines. The valley fold lines 13 have an angle of inclination, D, of about 45 degrees.

This angle of inclination can be arbitrarily determined, taking into consideration the bottle shape and the mechanism in which the peripheral wall of the body 4 undergoes volume-reducing deformation, because this mechanism have close relations with smooth discharge of the content fluid. However, it is preferred that the bottle has an L/H ratio in a range of 0.6 to 1.7 and an angle of inclination, D, in a range of 30 to 60 degrees relative to the central axis Ax.

Figure 8:
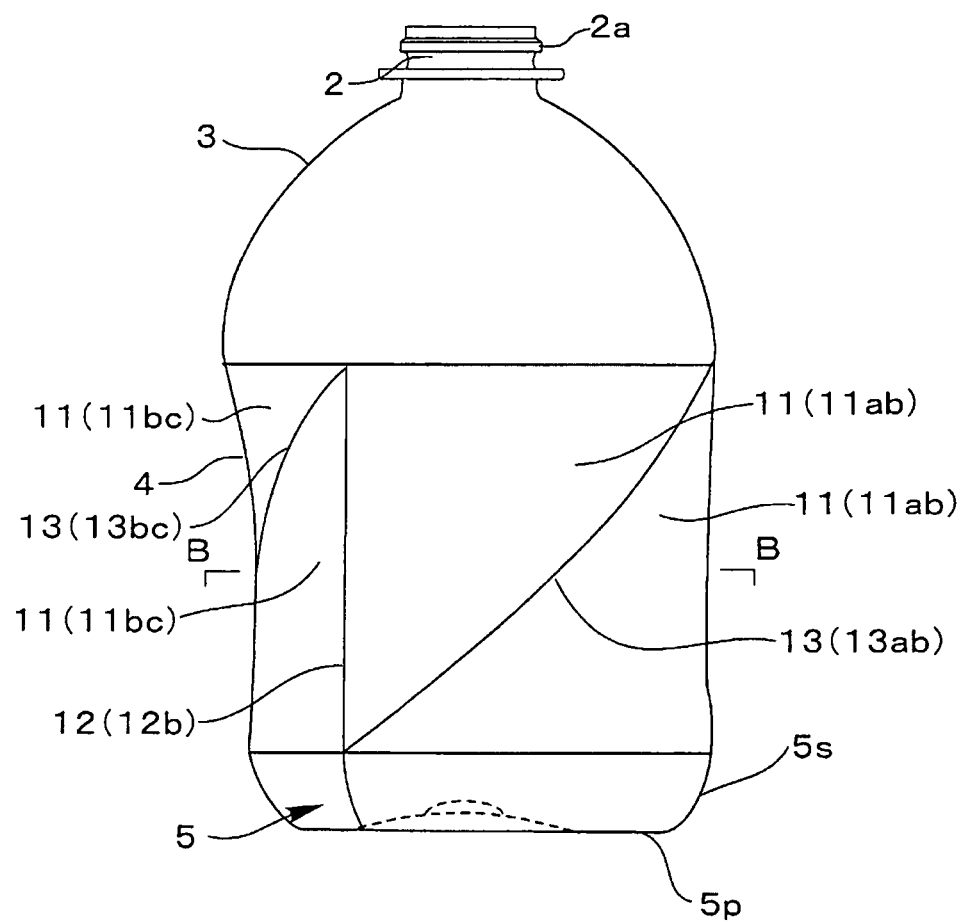
FIG. 8 is a side view of the bottle of this invention in the second embodiment.
Figure 9:
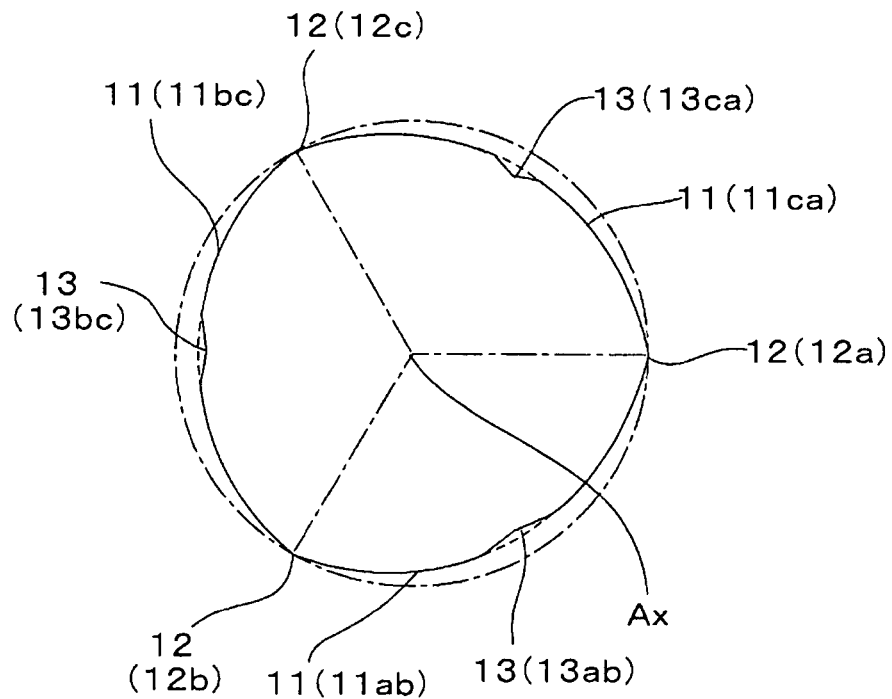
FIG. 9 is a plane cross-sectional view of the bottle taken along line B-B in FIG. 8.
Figure 10:
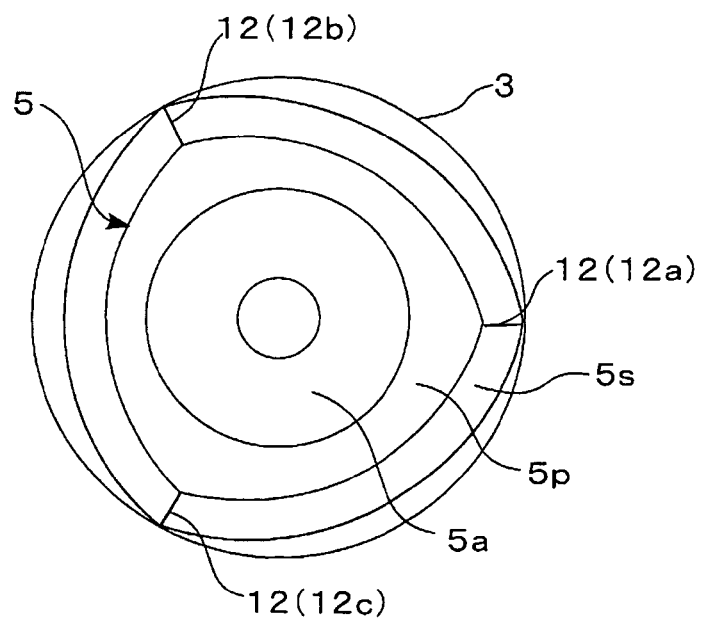
FIG. 10 is a bottom view of the bottle of FIG. 8.

FIGS. 8 and 9 show the bottle of this invention in the second embodiment. FIG. 8 corresponds to the side view of FIG. 2(a) that shows the bottle 1 in the first embodiment. FIG. 9 is a plan view of the bottle taken along line B-B in FIG. 8. FIG. 10 is a bottom view of the bottle. This bottle has a basically similar shape in the portions ranging from the shoulder 3 to the bottom 4, but the neck 2 has a peripheral ridge 2a instead of a screw thread, and the bottom 5 has the bottom plate in a triangular shape. In more details of the bottom 5, the three ridge lines 12a, 12b, 12c on the body 4 extend to the lower end of the side peripheral wall 5s. These ridge lines 12 divides the side peripheral wall 5s into three arc-like segments, which are connected to one another in a manner similar to the plan view of FIG. 9 to form a triangular shape. Thus, the bottom 5 is a short cylinder in a triangular shape with one end closed.

As will be described later, when force of twisting deformation acts on the bottle 1 in the first embodiment, the round bottom 5 changes to a nearly triangular shape, in which the lower ends of the three ridge lines form apexes, as shown in FIG. 7. On the other hand, in the case of the bottle 1 in the second embodiment shown in FIGS. 8-10, the bottom 5 has a predetermined triangular shape. Therefore, the twisting deformation, such as shown in FIG. 7, goes on smoothly, and the volume-reducing deformation of the bottle 1 also proceeds smoothly. In the bottle 1 in the first embodiment, the bottom 5 has a round cylindrical shape, as shown in FIG. 4, but in the second embodiment, the bottom 5 has a triangular cylindrical shape, as shown in FIG. 10. However, the bottom 5 is not limited specifically to these shapes, and may have a polygonal cylindrical shape, too. The shape of the bottom can be appropriately selected, considering the design of outer appearance, postural retaining capacity and smooth twisting deformation of the bottle at the time of volume-reducing deformation.

FIGS. 11-17 show the first embodiment associated with the "container combination" of this invention, in which the bottle 1 in the above-described first embodiment is used as the main body of the refill container A. The description will also include the behavior of the bottle 1 of the first embodiment in the volume-reducing deformation. In the first combination embodiment, the passage formed by opening the inner lid has a relatively large cross-sectional area so that the passage allows the bubbles of air to go up intermittently into the bottle. In this case, the content fluid flows down spontaneously under its own weight to an extent to which the whole amount is dischargeable.

Figure 11:
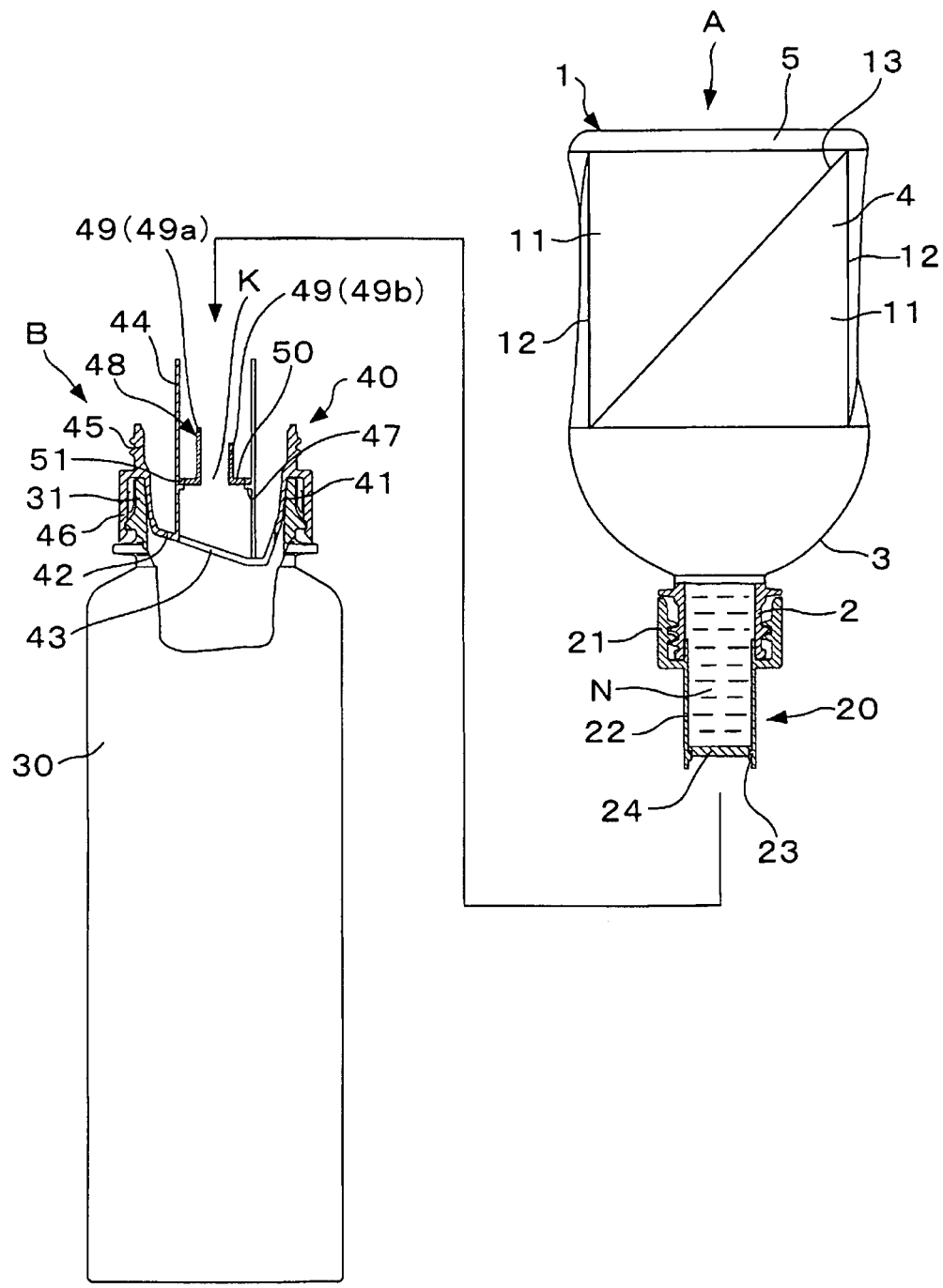
FIG. 11 is an explanatory assembly diagram, with a part in a vertical section, showing the first embodiment for the combination of a regularly used container and the refill container of this invention.
Figure 12:
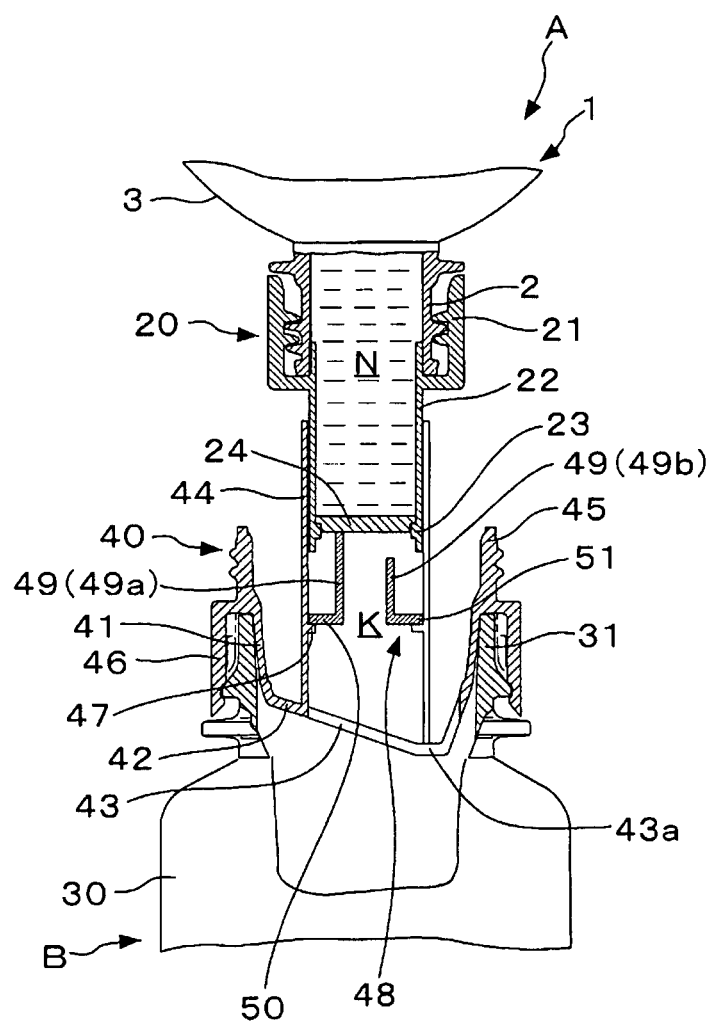
FIG. 12 is a partial vertical section of bottle neck portions fitted to each other in the embodiment of FIG. 11.

FIG. 11 is an explanatory diagram showing an assembly of two containers in this combination embodiment. As shown, the refill container A is assembled with the regularly used container B. The refill container A comprises the bottle 1 and a lid attachment 20 which is fitted to the neck 2 of the bottle 1

The lid attachment 20 (See FIGS. 11 and 12) comprises an attaching cylinder 21 which is screwed on the neck 2 of the bottle 1, a fitting cylinder 22 standing from a flat portion at the upper end of the attaching cylinder 21, an inner peripheral engaging ridge 23 disposed inside the upper-end opening of the fitting cylinder 22, and an inner lid 24 which closes this fitting cylinder 22 in a state in which the lid 24 is engaged with this engaging ridge 23 in a liquid-tight manner. The fitting of the lid attachment 20 to the neck 2 is not limited to the screw engagement but it may also be an undercut engagement.

The attaching cylinder 21 has a straight cylindrical shape and the strength enough to hold the refill container A stably in a situation where the refill container A in the inverted position is attached to the regularly used container B.

A portion of the fitting cylinder 22 extends downward (or upward in the inverted posture) and fits in the neck 2 tightly. This portion serves to enhance the liquid-tight fitting of the lid attachment to the neck 2.

Meanwhile, the regularly used container B (See FIGS. 11 and 12) comprises a bottle-shaped container main body 30 having a neck 31, a main body cap 40, and a lid opening device 48.

The main body cap 40 (See FIG. 12) has an inner fitting cylinder 41, which is fitted into the neck 31 of the container main body 30, and has a discharge cylinder segment 44 standing from a baseplate 42 of the inner fitting cylinder 41. This discharge cylinder segment 44 has a straight cylindrical shape, with a slit being cut in a part of the cylinder wall over an entire height range. A capping cylinder 45 stands from a top surface which extends laterally like a brim at the upper end of the inner fitting cylinder 41. A fixing cylinder 46 hangs from the outer peripheral edge of the top surface.

The baseplate 42 is a tapered plate declining to a somewhat lopsided position. The discharge cylinder segment 44 is disposed standing along the edge of the discharge opening 43 in a central area. A lower-end opening 43a is at a lowest position of the baseplate 42 where the slit in this discharge cylinder segment 44 is located. When the regularly used container B is being used, the lower-end opening 43a serves as a liquid return route. At the time of refilling the regularly used container B with the content fluid N, the lower-end opening 43a serves as air vent for the air inside the container main body 30.

The lid opening device 48 is disposed inside the discharge cylinder segment 44 at a somewhat lower position to push and raise the inner lid 24 disposed in the fitting cylinder 22, which is fitted in the discharge cylinder segment 44. The inner lid 24 is opened simply by fitting an inverted refill container A to the regularly used container B and pushing down the refill container A. An opening K is formed and ready for the content fluid N to flow down.

The capping cylinder 45 is a portion on which to fit a measuring cap (not shown) by a screw engagement. The fixing cylinder 46 is a portion to be used for an undercut engagement of a main body cap with the neck 31 of the container main body 30.

The refill work is now described, in which the content fluid N is transferred from the refill container A to the regularly used container B. The regularly used container B stands in an upright posture, and the refill container A is inverted. The fitting cylinder 22 of the inverted refill container A is fitted in the discharge cylinder segment 44 of the main body cap 40 of the regularly used container B (See FIG. 12).

When the refill container A is fitted to the regularly used container B, correct posture is guided and achieved by the fitting of the fitting cylinder 22 to the discharge cylinder segment 44. The deeper the fitting cylinder 22 is inserted in the discharge cylinder segment 44, the more stably the inverted refill container A is fitted to the regularly used container B.

The fitting cylinder 22 inserted into the discharge cylinder segment 44 is further pushed down. Then, pushing and holding portions 49 of the lid opening device 48 bumps into the inner lid 24, and act on the lid 24 so as to push and raise it.

When the fitting of the fitting cylinder 22 into the discharge cylinder segment 44 further proceeds, the inner lid 24 is pushed upward and begins to incline under the pushing force from a pushing portion 49a of the pushing and holding portions 49, and the opening K starts to open.

Figure 13:
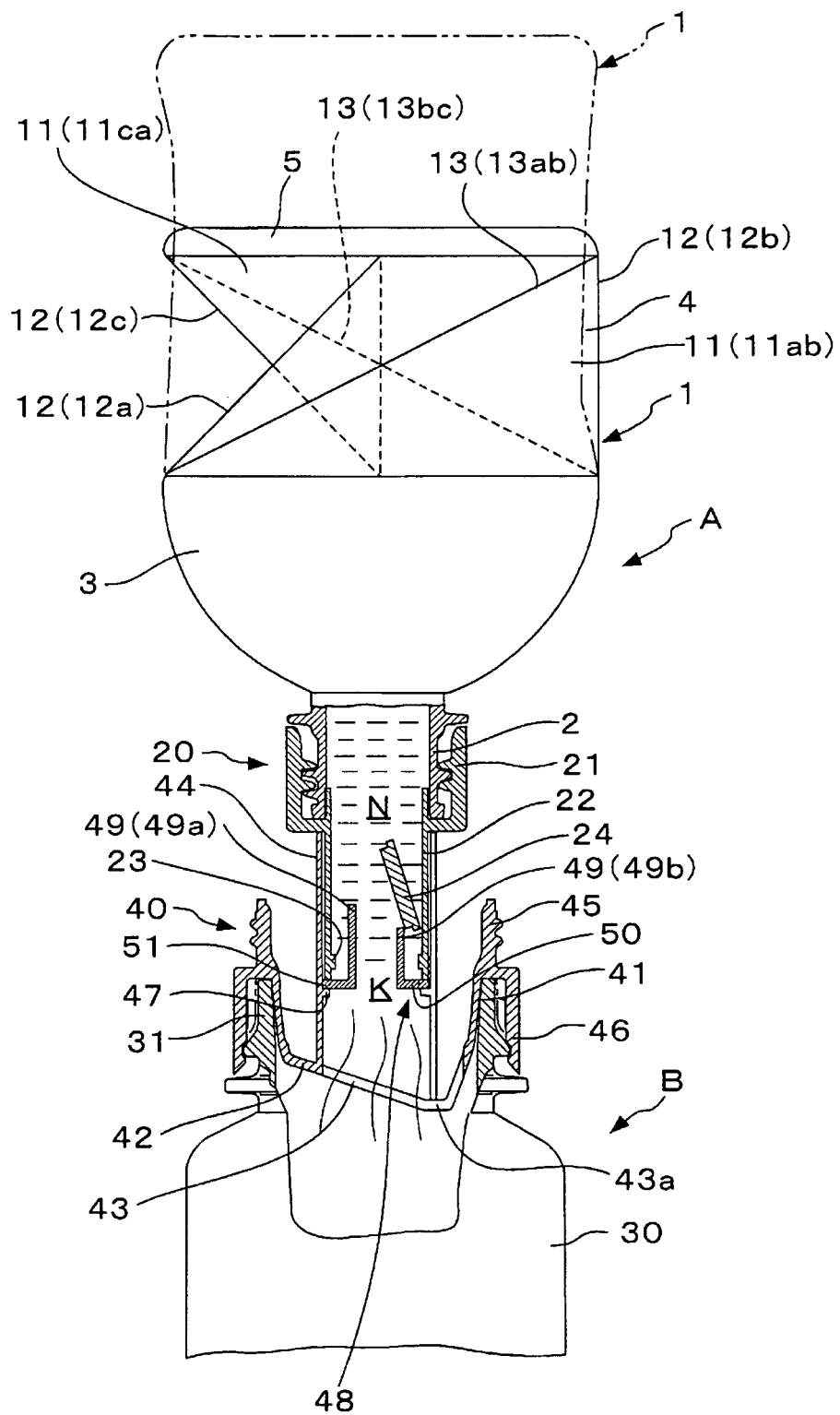
FIG. 13 is a partial vertical section of bottle neck portions showing refill work in midstream in the embodiment of FIG. 11.
Figure 14:
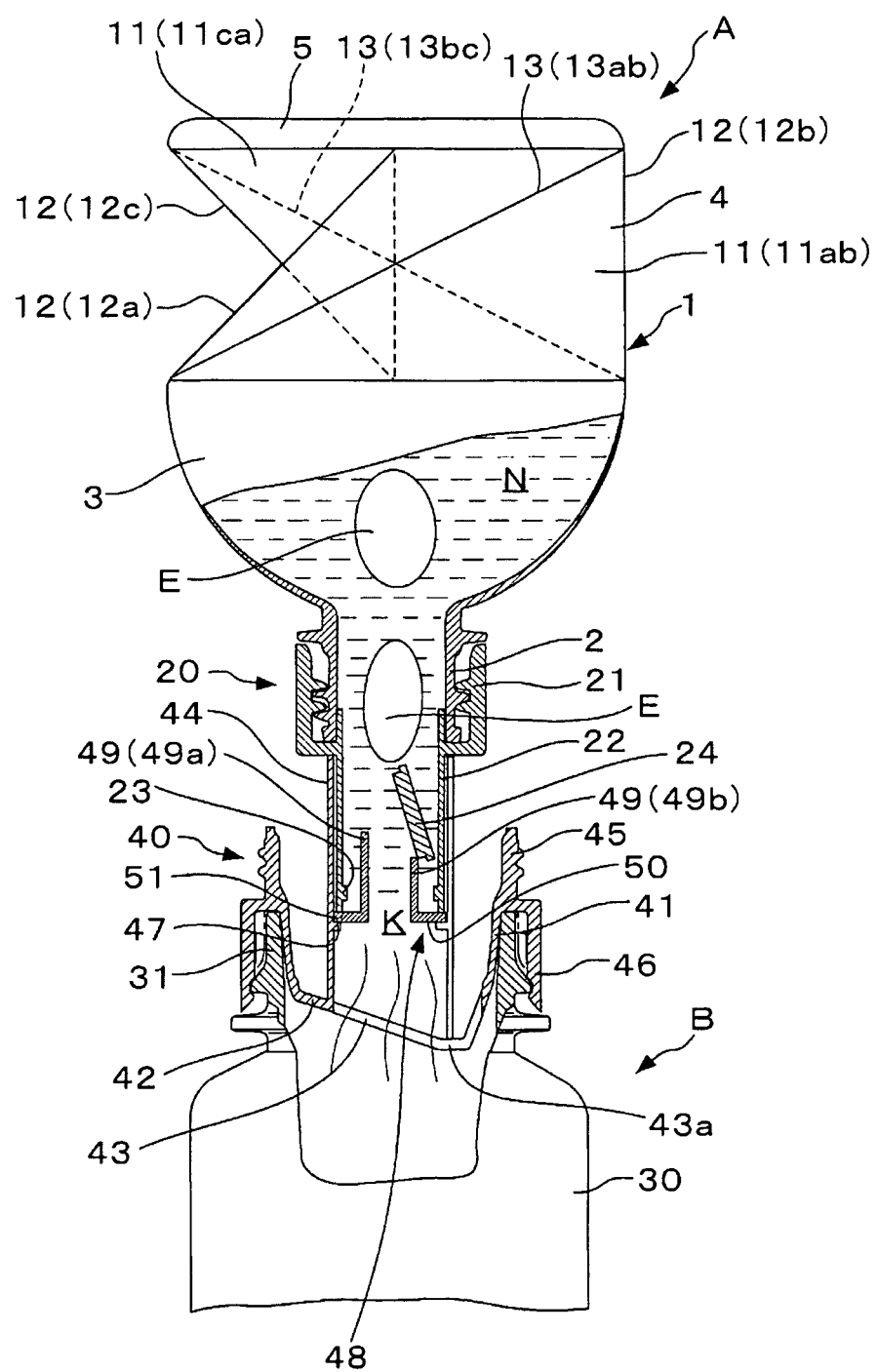
FIG. 14 is a partial vertical section of bottle neck portions showing another refill work in midstream in the embodiment of FIG. 11.
Figure 15:
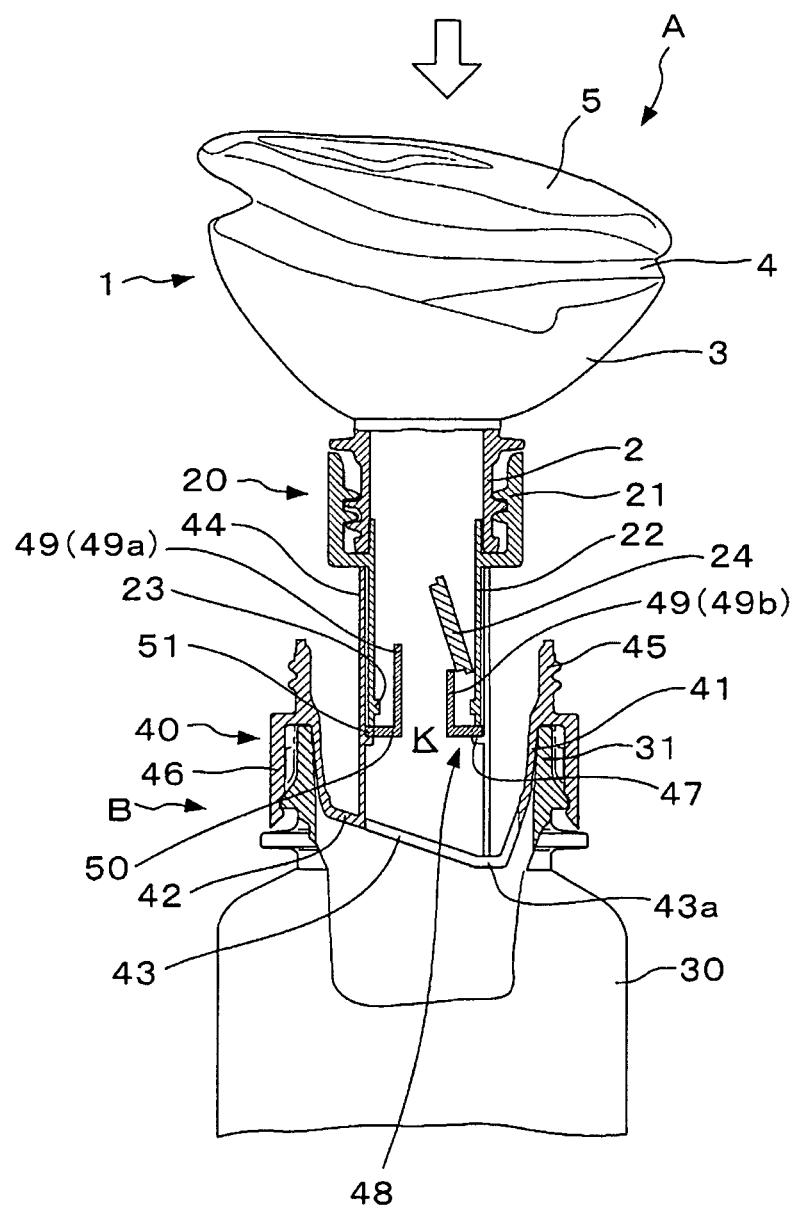
FIG. 15 is a partial vertical section of bottle neck portions showing also a squashed bottle upon completion of the refill work in the embodiment of FIG. 11.

When this fitting still goes on, the raised and inclined inner lid 24 becomes supported by a holding portion 49b, which keeps the inner lid 24 in the open posture, and thus, the opening K remains open (See FIG. 13).

Once the opening K is formed, the refill work proceeds. The content fluid N in the bottle 1 of the refill container A spontaneously flows down under its own weight, and goes into the container main body 30 of the regularly used container B. At that time, with the progression of refill work, the bottle 1 falls into a depressurized condition internally because of a decrease in the content remaining in the bottle 1.

When the inside of the bottle 1 becomes depressurized, the ridge lines 12 (12a, 12b, 12c) serve as pillars, but the panel walls 11 (11a, 11b, 11c) come to be folded along the valley fold lines 13 (13ab, 13bc, 13ca), thus deforming into a deflated shape to absorb the depressurization. Since the valley fold lines 13 are inclined in the same direction to the same extent, the body 4 is twisted, folded, and reduced in volume and height in the vertical direction (See FIG. 13).

Now a detailed description will be given below, while referring to FIGS. 6, 7, and 13, on the subjects of how to refill the regularly used container B with the content fluid and how the bottle 1 deforms along with the discharge and internal volume reduction of the content fluid. Roughly speaking, the volume-reducing deformation of the bottle 1 proceeds as follows: The shoulder 3 and the bottom 5 retain their original shapes throughout the process of discharging the content fluid from the bottle 1, as shown in FIGS. 6, 7, and 13. The body 4 has a relatively thin peripheral wall and the valley fold lines 13 from which the wall starts twisting deformation. At the same time, the bottle 1 shrinks in height from its original shape, as depicted by a two-dot chain line in FIG. 13, but retains its upright inverted posture. The bottom 5 shifts its position relative to the neck 2 by twisting about the central axis Ax of the bottle 1 (See outlined arrows in FIGS. 6 and 7), and goes downward.

In the state shown in FIGS. 6, 7, and 13, the bottom 5 turns around relative to the neck 2 by about 60 degrees. In the initial state of the bottle 1, the lower end portion of the shoulder 3 and the bottom 5 have a circular shape in the plan view and the bottom view, as shown in FIGS. 3 and 4. However, in the state of FIG. 7 where the force involved in the twisting deformation is at work, the circular planar shapes of the shoulder 3 and the bottom 5 have changed respectively into a nearly triangular shape having apexes at the upper ends of the three ridge lines 12 and a corresponding triangular shape having apexes at the lower ends of the three ridge lines. These triangular shapes are more difficult to become flat than a tetragonal or polygonal shape when lateral force acts on. As such, these triangular shapes can stably hold the bottle 1 in the inverted posture.

As the discharge goes on, each constituent element of the bottle 1 undergoes volume-reducing deformation in the following manner: With the progression of inside depressurization, the pushing force acts on the entire peripheral wall of the bottle 1. Since the semi-spherical shoulder 3 and the bottom 5 have thicker walls than the body 4, these portions are less susceptible to the pushing force. It is the panel walls 11, which make up the body 4, that collapsing deformation takes place, because the panel walls 11 are relatively thin and contain valley fold lines from which the collapsing deformation starts.

At that time, the three valley fold lines 13 shift their positions so as to come close to the central axis Ax of the bottle 1. Each panel wall 11 is folded, starting from each valley fold line 13 and spreading along the valley fold line 13, and the bottle 1 deforms into a squashed shape. The plan view of FIG. 7 shows that the three valley fold lines 13ab, 13bc, 13ca are visible through the opening of the neck 2 at positions close to the central axis Ax.

The three ridge lines 12a, 12b, 12c are originally disposed in the vertical direction. With the collapsing deformation of the panel walls 11, the ridge lines are folded and inclined, as clearly shown in the ridge lines 12b and 12c in FIG. 6. During the progression of volume-reducing deformation, the ridge lines 12 keep the initial distance to the central axis Ax of the bottle 1, and ensure that the outlined shape of the peripheral wall forms a regular triangular shape in the plan view. Even under a deformed condition caused by volume reduction, the ridge lines 12 serve as pillars resisting the force laterally acting on the bottle 1, and perform a function of retaining the inverted posture of the bottle 1 stably, as can be seen in FIG. 7.

Each ridge line 12 is folded and inclined, while keeping the initial distance to the central axis Ax. This displacement causes the twisting deformation of the bottle 1 to proceed. Thus, the bottom 5 rotates relative to the neck 2 about the central axis Ax of the bottle 1, and goes downward.

As the discharge of the content fluid goes on, the three ridge lines 12a, 12b, 12c come close to one another nearby the middle height positions, as understood also from FIG. 7. At one point of the collapsing deformation where the volume reduction causes the body 4 to shrink in the vertical direction, the spontaneous discharge of the content fluid N under its own weight comes to a halt once due to the bumps between the folded portions of the peripheral wall of the body 4 and because of an increased extent of depressurization inside the bottle 1.

However, this discontinued discharge of the content fluid N is only temporary. Since in this first combination embodiment, the opening K is large enough to allow the content fluid N to flow down spontaneously, the discharge of the content fluid N resumes intermittently from then on while bubbles of outside air go up into the bottle through the opening K (See FIG. 14). Thus, the refill work for the entire content fluid N can be completed.

After the refill work for the content fluid N is complete, the body 4 of the bottle 1 is in a vertically folded state to some extent. The bottle 1 is further squashed by a hand in the vertical direction (i.e., the direction shown by an outlined arrow in FIG. 15). The body 4 of the bottle 1 having the peripheral wall in a folded and overlapped state is fully squashed by embedding the bottom 5 into the semi-spherical shoulder 3, while rotating the body 4. The bottle is stable in its squashed state and can be directly passed on to waste disposal.

FIG. 7 shows the bottom 5 which has been turned by 60 degrees relative to the neck 2. However, when the bottle 1 is squashed, preferably the bottom may be turned by up to about 120 degrees from its original position. In that case, the triangular shapes of the bottom 5 and the shoulder 3 totally overlap together, thus enabling to maintain the squashed state of the bottle 1. Furthermore, if the bottle 1 is still pushed down and the bottom 5 is embedded into the semi-spherical shoulder 3 under this overlapped condition, the squashed bottle can be maintained much more stably, and the bottle is in a favorable state for waste disposal.

As described above, the intermittent discharge of the content fluid N is achieved by setting the opening K so as to have a large cross-sectional area. In the first combination embodiment, the size of the opening K is set by utilizing the lid opening device 48. As shown in FIG. 16, this lid opening device 48 comprises the pushing and holding portions 49 which comprise a pushing portion 49a and a holding portion 49b, arms 50 from which the pushing and holding portions 49 rise, and a fitting ring 51. The lid opening device 48 is fitted to the discharge cylinder segment 44 by engaging the fitting ring 51 with an engaging rib 47 disposed on the inner peripheral wall of the discharge cylinder segment 44.

In the case of the lid opening device shown in FIG. 16, the pushing and holding portions 49 has a tall pushing portion 49a and a short holding portion 49b. These portions are separately disposed on the sides opposite to each other across a central area. This structure allows the inner lid 24 to be pushed and raised to one side, and retains the inner lid 24 at an open position.

The arms 50 stick out toward the end positions where the pushing and holding portions 49 rise therefrom. This configuration give the opening K as wide a cross-sectional area as possible, as shown in FIG. 16(b), which is a cross-sectional view taken along line A-A of FIG. 16(a).

Figure 17:
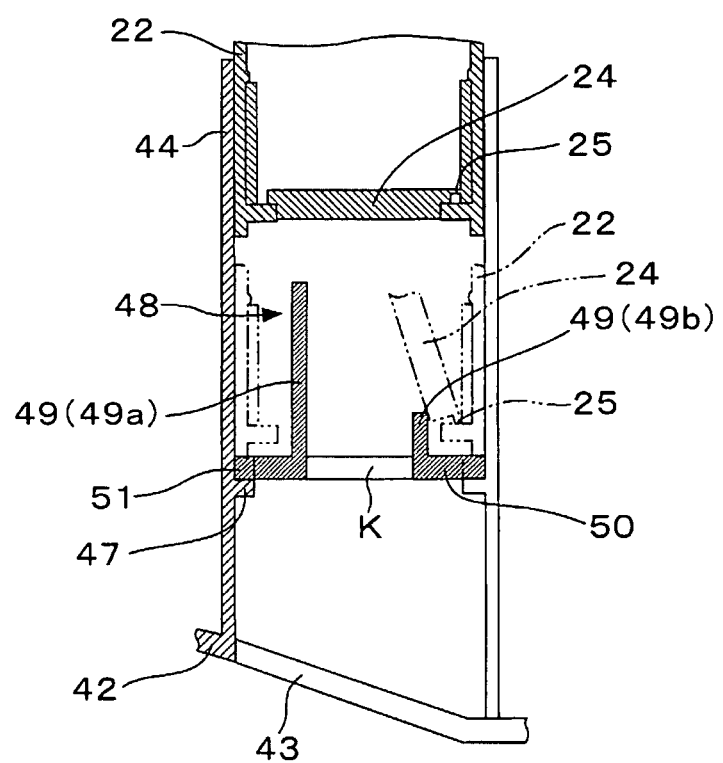
FIG. 17 is a vertical section of an inner lid in another embodiment.
Figure 18:
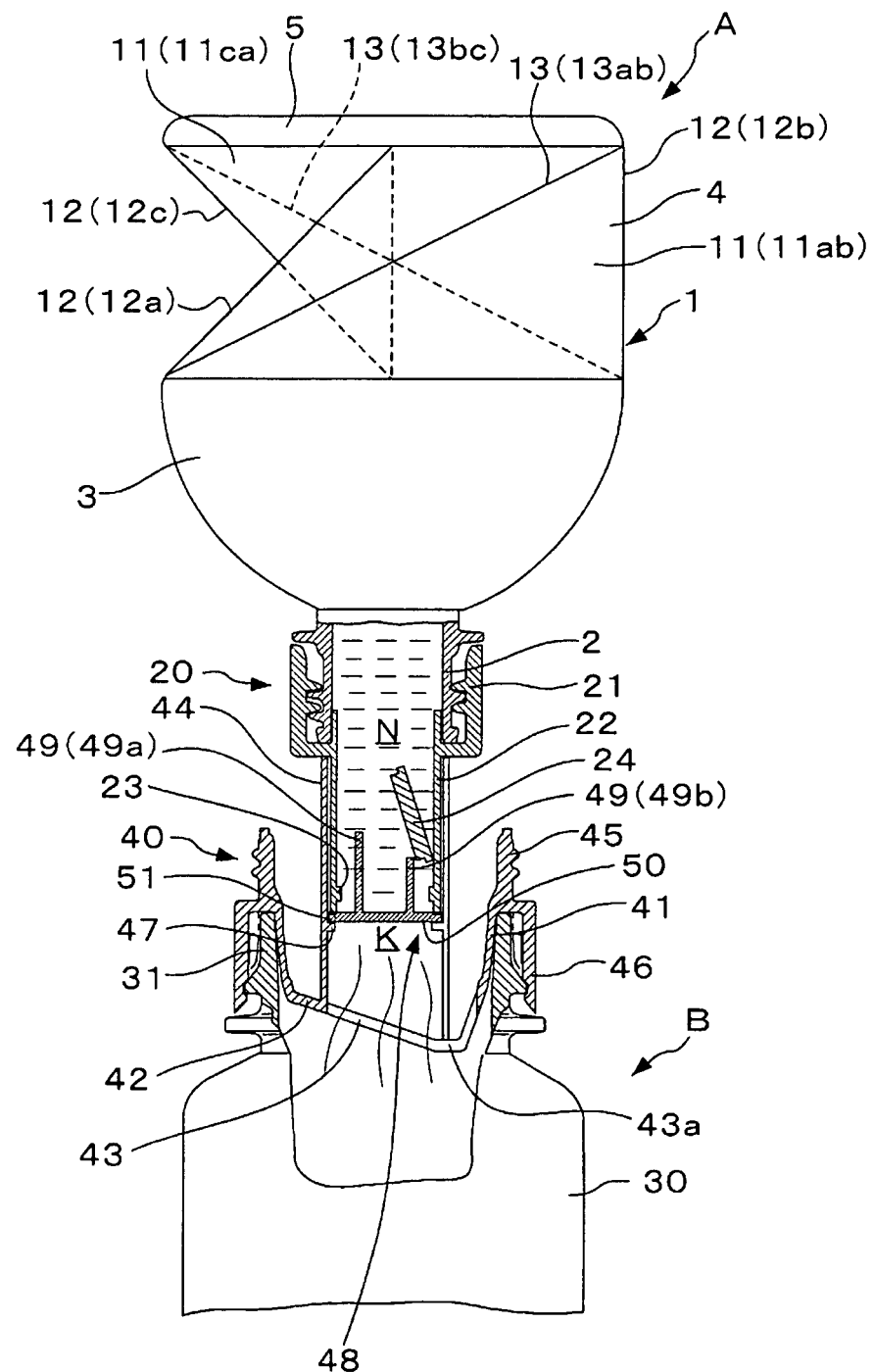
FIG. 18 is a partial vertical section of bottle neck portions showing the refill work in midstream in the second embodiment for the combination of the regularly used container and the refill container of this invention.
Figure 19:
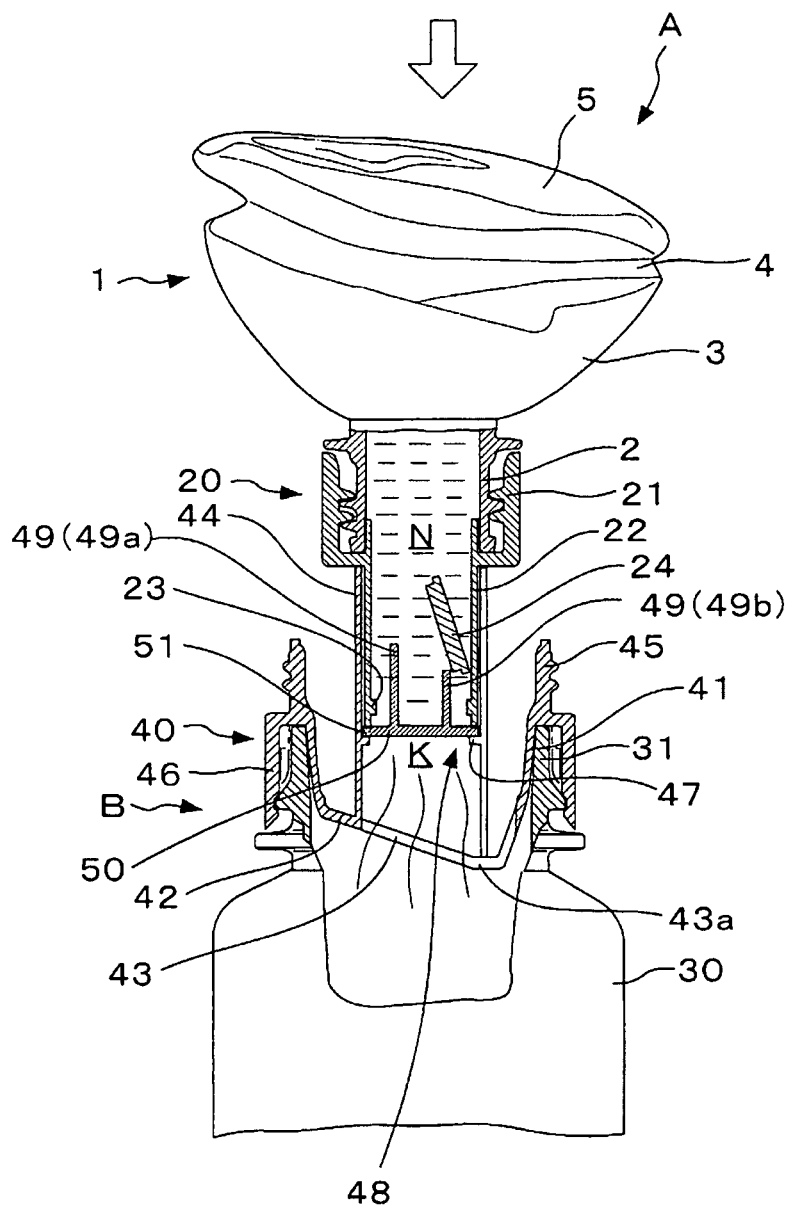
FIG. 19 is a partial vertical section showing a bottle state in which the bottle is about to be pushed down in the combination embodiment of FIG. 18.

FIG. 17 shows an inner lid 24 having a hinge 25 in combination with the pushing and holding portions 49. The inner lid 24 having the hinge 25 is stable and constant in its raising and inclining direction, and thus, the opening K is stably opened by opening and inclining the inner lid 24.

In the case of the embodiment shown in FIG. 17, the lid opening device 48 is molded separately from the discharge cylinder segment 44. However, it is possible for the lid opening device 48 to be molded integrally with the discharge cylinder segment 44.

There is the force to allow the content fluid N to flow down spontaneously under its own weight, and there is the force to prevent the content fluid N from spontaneous flow, now that the flow is affected by the depressurization and deformation of the bottle. The adjustment of a balance between these types of force is not limited to the adjustment of the size of the opening K controlled by the lid opening device 48. The point is that any means can be adopted as long as the cross-sectional area can be adjusted for the refill passage formed between the refill container A and the regularly used container B.

The inner lid 24 is fitted to the fitting cylinder 22 in the structure of the first combination embodiment, but the fitting is not limited this example. The inner lid 24 may be integrally molded with the fitting cylinder 22.

FIGS. 18-21 show the second embodiment associated with the "container combination" of this invention, in which the bottle 1 in FIG. 1 (above described bottle of this invention in the first embodiment) is used as the main container body of the refill container A. The second "container combination" embodiment has a similar structure to that of the first combination embodiment, but in this embodiment, the shape of the lid opening device 48 is changed, and the size of the opening K formed by pushing and raising the inner lid (24) is restricted. The passage is designed to have a cross-sectional area smaller than that of the counterpart in the first "container combination" embodiment. In this case, there would be no intermittent flow of the content fluid.

When the discharge of the content fluid N goes on and depressurization develops inside the bottle 1 in this container combination embodiment, the panel walls 11 deform into a folded and squashed shape to absorb the reduced pressure, with the ridge lines 12 serving as the pillars, and the valley fold lines 13 serving as the folds. Since at that time, the valley fold lines 13 are inclined in parallel in the same direction, the body 4 is twisted and folded, and shrinks in height in response to volume reduction (See FIG. 18).

If the volume-reducing deformation is further in progress, with the body 4 continuing to shrink in the vertical direction, the folded portions of the peripheral wall of the body 4 bump into one another, and there is also an increased extent of depressurization inside the bottle 1. Affected by these factors, the spontaneous flow of the content fluid N under its own weight comes to a halt. In the case of this combination embodiment, the cross-sectional area of the passage formed by pushing and raising the inner lid 24 is set at a level in which the content fluid N would not flow down intermittently. In other words, the size of the opening K is restricted, and thus, the halt condition is maintained.

Once the discharge of the content fluid N has come to a halt, further depressive force is applied to the bottom 5 of the bottle 1 to push down the already vertically folded bottle 1 (See the outlined arrow in FIG. 19), thereby to discharge forcibly any remaining amount of the content fluid N and to finish the refill work.

As shown in FIG. 7, the bottom 5 has rotated by about 60 degrees relative to the neck 2. When the bottle 1 is further squashed from this folded state of the body 4, the bottom 5 rotates again by up to about 120 degrees from its original position. The triangular shapes of the bottom 5 and the shoulder 3 come to totally overlap together and can maintain stably the squashed state of the bottle 1. If the bottom 5 is further pressed down fully so that it would be embedded into the shoulder 3, then the bottle 1 gets a more steadily squashed state enough to put it to waste disposal.

According to the feature of this combination embodiment, the opening K has a restricted size so that the discharge of the content fluid N would come to a halt halfway during the folding deformation of the bottle 1. FIGS. 20 and 21 show an exemplified way of restricting the size of the opening K by utilizing the lid opening device 48. As seen in FIG. 20, the lid opening device 48 comprises a pair of the pushing and holding portions 49 (the pushing portion 49a and the holding portion 49b), arms 50 from which the pushing and holding portions 49 rise, and a fitting ring 51. The lid opening device 48 is fitted to the discharge cylinder segment 44 by bringing the fitting ring 51 to an engagement with an engaging rib 47 disposed on the inner peripheral wall of the discharge cylinder segment 44.

In the case of the lid opening device shown in FIG. 20, the pushing and holding portions 49 have a tall pushing portion 49a and a short holding portion 49b. These portions are separately disposed on the sides opposite to each other across a central area. This structure allows the inner lid 24 to be pushed and raised to one side, and retains the inner lid 24 at an open position.

Figure 20A:
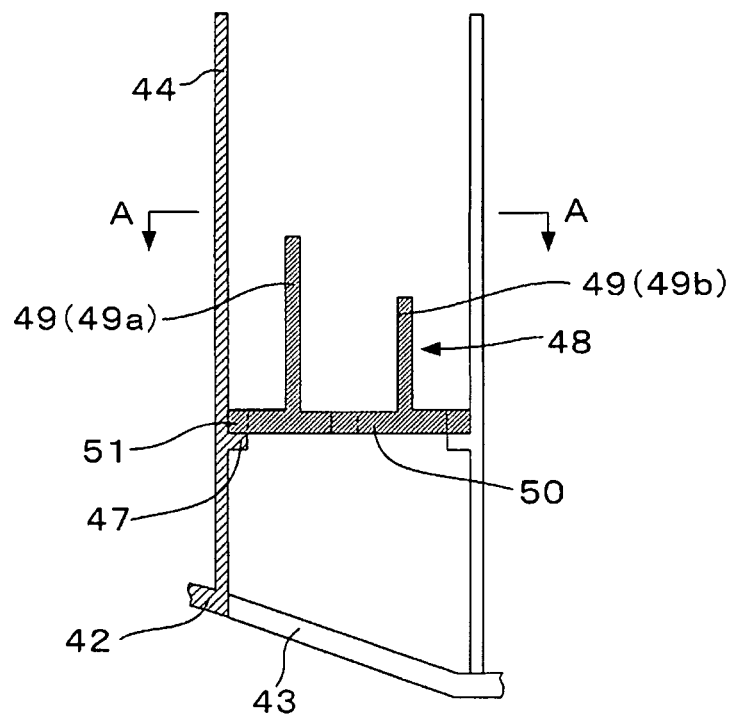
FIGS. 20(a) and 20(b) are a vertical section and a cross-section, respectively, of the lid opening device shown in FIG. 18.
Figure 20B:
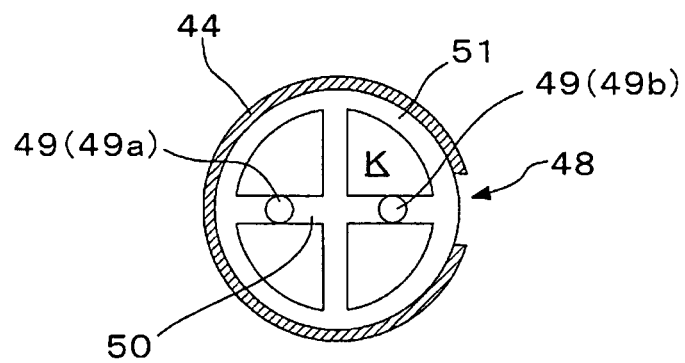

FIG. 20(b) is a plan view of the lid opening device 48 taken along line A-A in FIG. 20(a). As shown, the arms 50, from which the pushing and holding portions 49 rise, have a cross-like shape, which restricts the size of the opening K.

Figure 21A:
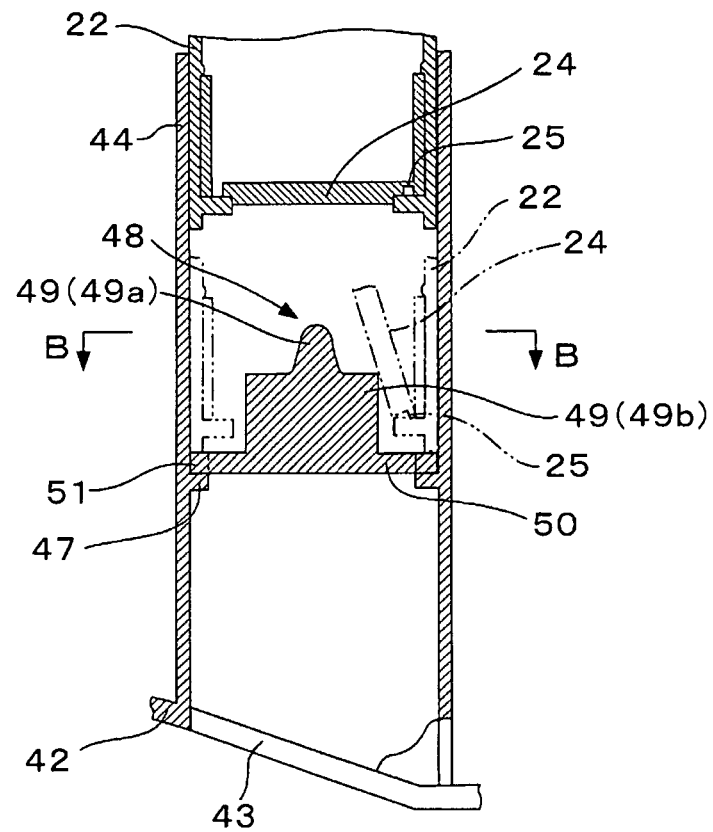
FIGS. 21(a) and 21(b) are a vertical section and a cross section, respectively, of the lid opening device in still another embodiment.
Figure 21B:
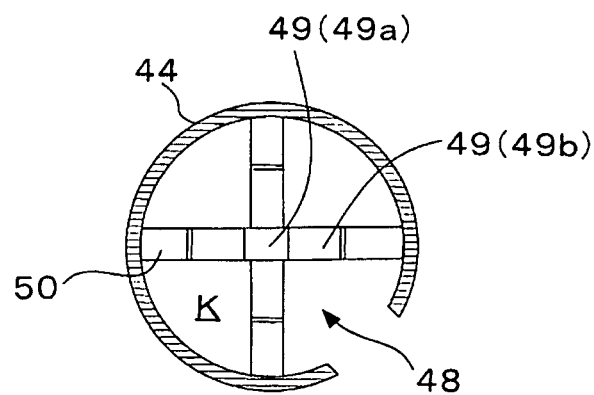

In an example of the lid opening device 48 shown in FIG. 21, the pushing and holding portions 49 have the shapes that can work with the inner lid 24 having a hinge 25. The pushing portion 49a projects from the center of the pushing and holding portions 49, and the holding portion 49b for holding the inner lid 24 at an open position is disposed on one side. FIG. 21(b) is a plan view of the lid opening device 48 taken along line B-B in FIG. 21(a). As shown in FIG. 21(b), the arms 50 are disposed in a cross-like shape to restrict the size of the opening K.

The inner lid 24 has a hinge 25 in the embodiment shown in FIG. 21. Since the direction in which the inner lid 24 is raised and inclined is constant and steady, the opening K is stably opened by opening and inclining the inner lid 24. The embodiment shown in FIGS. 20 and 21 has a structure in which the lid opening device 48 is separately prepared and is installed on the discharge cylinder segment 44. However, it is possible for the lid opening device 48 to be integrally molded with the discharge cylinder segment 44.

The discharge passage is formed by opening the inner lid 24 to allow the content fluid N to flow down. A means of determining the cross-sectional area of this discharge passage is not limited to the adjustment of the size of the opening K which is determined by the lid opening device 48. Any appropriate means can be taken, for example, by preliminarily setting up a portion for decreasing the passage area, at some point along the passage.

This invention has been described above with respect to preferred embodiments and action-and-effects of the bottle and the "container combination" utilizing the bottle of this invention. However, this invention is not limited to these embodiments. For example, the bottle is not limited to a capacity of 300 ml. The bottle is not limited to a biaxially drawn, blow molded bottle made of a polypropylene resin, but other blow molded products made of various resins can be used, including a biaxially drawn, blow molded bottle of a PET resin and a direct blow molded bottle made of a polyethylene resin. The above embodiments were described by utilizing the bottle of this invention as the refill container. This bottle is fully squashed in the height direction. As it is, the bottle in the squashed state can be put to waste disposal. Thus, the bottle can be used by itself while taking advantage of such features as resources saving and easy disposability.

Regarding the shapes of those members which form the connecting portions between the regularly used container and the refill container, including the main body cap, the lid attachment, the inner lid, the lid opening device, and the like, many other variations can be adopted in the "container combination" of this invention.

INDUSTRIAL APPLICABILITY

As described above, the synthetic resin bottle of this invention makes it possible to proceed smoothly with the volume-reducing deformation caused by the depressurization inside the bottle, while retaining an upright or inverted position. Therefore, wide use applications are expected in the field of refill containers and in other fields. The combination of the regularly used container and the refill container ensures that the content fluid is prevented from liquid splashes and drips during the refill work. The refill work can be easily carried out by flowing down the content fluid smoothly without supporting the bottle with a hand. The bottle emptied of its refill can be fully reduced in its size simply and stably. Thus, wide use applications are expected from these points, too.

DESCRIPTIONS OF REFERENCE SIGNS

1. Bottle
2. Neck
2a. Circumferential ridge
3. Shoulder
4. Body
5. Bottom
5a. Sunken portion
5s. Side peripheral wall
11 (11ab, 11bc, 11ca): Panel wall
12 (12a, 12b, 12c): Ridge line
13 (13ab, 13bc, 13ca): Valley fold line A. Refill container
20. Lid attachment
21. Attaching cylinder
22. Fitting cylinder
23. Inner peripheral engaging ridge
24. Inner lid
25. Hinge
B. Regularly used container
30. Container main body
31. Neck
40. Main body cap
41. Inner fitting cylinder
42. Baseplate
43. Discharge opening
43a. Lower-end opening
44. Discharge cylinder segment
45. Capping cylinder
46. Fixing cylinder
47. Engaging rib
48. Lid opening device
49. Pushing and holding portion
49a. Pushing portion
49b. Holding portion
50. Arm
51. Fitting ring
E. Air bubble
K. Opening
N. Content fluid

The invention claimed is:

1. A blow molded synthetic resin bottle that allows for volume-reducing deformation, the blow molded synthetic resin bottle comprising:
 a neck;
 a cylindrical body configured to have a thin peripheral wall, including three ridge lines formed in a mountain fold at approximately equal intervals in a vertical direction, the thin peripheral wall includes three panel walls connected to one another, with each panel wall being bordered by two adjacent ridge lines, each panel wall having a valley fold line diagonally connecting an upper end of one ridge line to a lower end of another adjacent ridge line such that three valley fold lines are disposed obliquely in parallel along a circumferential direction, and the volume-reducing deformation of the body occurs in response to depressurization inside the bottle;
 a tapered cylindrical shoulder having a lower end portion deforming into a first triangular shape with the apexes of the first triangular shape being formed by upper ends of the three ridge lines in response to an occurrence of the volume-reducing deformation; and
 a bottom configured to deform into a second triangular shape with the apexes of the second triangular shape being formed by lower ends of the three ridge lines in response to an occurrence of the volume-reducing deformation.

2. The synthetic resin bottle according to claim 1, wherein the peripheral wall of the body has an average thickness of 0.2 mm or less.

3. The synthetic resin bottle according to claim 1, wherein a ratio of a length (L) between two adjacent ridge lines to a height (H) of each ridge line, i.e., a length to height (L/H) ratio, is set in a range of from 0.6 to 1.7.

4. The synthetic resin bottle according to claim 1, wherein the shoulder and the bottom have, respectively, a semi-spherical shell shape and a short cylindrical shape with one end closed.

5. The synthetic resin bottle according to claim 1, wherein the three ridge lines are extended to a side peripheral wall of the bottom so that these ridge lines give the bottom a short triangular cylindrical shape with one end closed.

6. The synthetic resin bottle according to claim 1, wherein a sunken portion is formed in a central area of the bottom by allowing a bottom plate to draw upward in an inward direction of the bottle.

7. A combination of a regularly used container and a refill container that makes a content fluid refillable when the refill container is fitted to the regularly used container,
 the refill container is a synthetic resin bottle according to claim 1,
 the regularly used container having a main-body cap fitted to a neck of a container main body, with the cap having a discharge cylinder segment disposed upright in the neck to form a discharge passage,
 and the refill container contains the content fluid for refill use and has a lid attachment fitted to the neck of the refill container, the combination being further characterized in that:
 a body of the refill container is formed to have a thin wall so that volume-reducing deformation can proceed along with inside depressurization that takes place when the content fluid to be discharged flows spontaneously from the refill container due to gravity,
 the lid attachment has a fitting cylinder which is fitted in the discharge cylinder segment of the regularly used container and an inner lid used to close this fitting cylinder, and
 a lid opening device is disposed inside the discharge cylinder segment of the regularly used container to push and raise the inner lid of the fitting cylinder fitted to the neck of the refill container.

8. The combination of the regularly used container and the refill container according to claim 7, wherein a cross-sectional area of the discharge passage formed by opening the inner lid is set at a level large enough to enable air bubbles to go up intermittently alongside the downward flow of the content fluid, and can be discharged in all amount by spontaneous flow under its own weight.

9. The combination of the regularly used container and the refill container according to claim 7, wherein the cross-sectional area of the discharge passage formed by opening the inner lid is set at a level small enough to cause no air bubble to go up alongside the downward flow of the content fluid, and wherein any remaining content fluid is forcibly discharged by pushing down on the bottom of the refill container.

10. The combination of the regularly used container and the refill container according to claim 7, wherein the inner lid is disposed in a foremost portion of the fitting cylinder.

11. The combination of the regularly used container and the refill container according to claim 7, wherein the lid opening device is provided with pushing and holding portion, which comprise a pushing portion for pushing and opening the inner lid, and a holding portion for keeping the inner lid in an open state.

12. The combination of the regularly used container and the refill container according to claim 7, wherein the inner lid is fitted to the fitting cylinder by a hinge.

* * * * *